US011778509B2

(12) United States Patent
Catovic et al.

(10) Patent No.: US 11,778,509 B2
(45) Date of Patent: Oct. 3, 2023

(54) ETHERNET HEADER COMPRESSION FOR DATA SENT OVER NON-ACCESS STRATUM (NAS) CONTROL PLANE

(71) Applicant: QUALCOMM Incorporated, San Diego, CA (US)

(72) Inventors: Amer Catovic, San Diego, CA (US); Lenaig Genevieve Chaponniere, La Jolla, CA (US); Miguel Griot, La Jolla, CA (US); Hong Cheng, Basking Ridge, NJ (US); Sebastian Speicher, Wallisellen (CH); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/215,542

(22) Filed: Mar. 29, 2021

(65) Prior Publication Data

US 2021/0314812 A1    Oct. 7, 2021

Related U.S. Application Data

(60) Provisional application No. 63/004,326, filed on Apr. 2, 2020.

(51) Int. Cl.
*H04W 28/06* (2009.01)
*H04W 28/02* (2009.01)

(52) U.S. Cl.
CPC ....... *H04W 28/06* (2013.01); *H04W 28/0215* (2013.01)

(58) Field of Classification Search
CPC .. H04W 28/06; H04W 28/0215; H04L 69/04; H04L 67/141
See application file for complete search history.

(56) References Cited

U.S. PATENT DOCUMENTS

2002/0097723 A1* 7/2002 Tourunen ............... H04L 69/04
                                                              370/349
2020/0137174 A1* 4/2020 Stammers ............ H04L 67/141

OTHER PUBLICATIONS

3GPP TS 24.501 V16.3.0 (Year: 2019).*
(Continued)

*Primary Examiner* — Mandish K Randhawa
(74) *Attorney, Agent, or Firm* — Loza & Loza, LLP

(57) ABSTRACT

Enabling Ethernet Header Compression (EHC) for use with data sent within a Non-Access Stratum (NAS) control plane of a wireless communication network. In one aspect, a wireless communication device sends a signal to a wireless communication network indicating the device supports EHC for data transfer over a control plane. The device obtains a response from the wireless communication network indicating the wireless communication network supports EHC for data transfer over the control plane. The device then sends an Ethernet packet compressed using EHC to the wireless communication network over the control plane. The wireless communication device may be configured to send a request to the wireless communication network to use EHC before sending the Ethernet packet compressed using EHC. The device then sends the compressed Ethernet packet only if the request is granted. In another aspects, complementary EHC features are provided within a network component of the wireless communication network.

30 Claims, 23 Drawing Sheets

(56) References Cited

OTHER PUBLICATIONS

3GPP: "3rd Generation Partnership Project, Technical Specification Group Services and System Aspects: Procedures for the 5G System (5GS), Stage 2 (Release 16)", 3GPP TS 23.502, V16.4.0 (Mar. 2020), Mar. 27, 2020 (Mar. 27, 2020), XP002803444, pp. 1-584, Retrieved from the Internet: URL: https://portal.3gpp.org/desktopmodules/Specifications/SpecificationDetails.aspx?specificationId=3145 [retrieved on Jun. 23, 2021] Chapter 4. 3, Session Management procedures, p. 85-p. 95, figures 4.3 .2.2-1, sections 4.9-4.12.

International Search Report and Written Opinion—PCT/US2021/024898—ISA/EPO—dated Jul. 5, 2021.

\* cited by examiner

Core Network of Wireless Communication Network 1600

Network interface/wireless transceiver 1602

Receive component configured to receive and decode a signal from a wireless communication device (such as a UE) that includes an indicator to indicate the wireless communication device supports Ethernet header compression (EHC) for data transfer over a control plane of the wireless communication network 1604

Response component configured to generate and send a response to the wireless communication device indicating the wireless communication network supports EHC for data transfer over the control plane of the wireless communication network 1606

Data transfer component configured to perform data transfer of Ethernet packets with the wireless communication device over the control plane of the wireless communication network while performing EHC 1608

FIG. 16

Wireless Communication Device (e.g. UE) 1700

Wireless transceiver 1702

Capability announcement component configured to generate and send a signal to a wireless communication network indicating the wireless communication device supports Ethernet header compression (EHC) for data transfer over a control plane of the wireless communication network 1704

Receive component configured to receive and decode a response from the wireless communication network indicating the wireless communication network supports EHC for data transfer over the control plane 1706

Data transfer component configured to perform data transfer of Ethernet packets with the wireless communication network over the control plane of the wireless communication network while performing EHC 1708

FIG. 17

ETHERNET HEADER COMPRESSION FOR DATA SENT OVER NON-ACCESS STRATUM (NAS) CONTROL PLANE

CROSS-REFERENCE TO RELATED APPLICATIONS

This application claims priority based on U.S. Provisional Patent Application Ser. No. 63/004,326, filed Apr. 2, 2020, for "ETHERNET HEADER COMPRESSION FOR DATA SENT OVER NON-ACCESS STRATUM (NAS) CONTROL PLANE OF WIRELESS COMMUNICATION NETWORK," which is assigned to the assignee hereof and incorporated by reference herein in its entirety.

FIELD OF THE DISCLOSURE

The technology discussed herein relates generally to wireless communication networks and more particularly to Ethernet header compression.

DESCRIPTION OF RELATED ART

Wireless communication networks are widely deployed to provide various wireless communication services such as telephony, video, data, messaging, broadcasts, and so on. Some wireless communication networks provide for transmission of Ethernet data packets. Ethernet header compression (EHC) is a procedure for reducing the size of many Ethernet packets by compressing or suppressing a header portion of the packet.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect of the disclosure, a wireless communication device is provided that includes a transceiver; and a processor coupled to the transceiver, wherein the processor is configured to: send a signal to a wireless communication network indicating the wireless communication device supports Ethernet header compression (EHC) for data transfer over a control plane; obtain a response from the wireless communication network indicating the wireless communication network supports EHC for data transfer over the control plane; and communicate with the wireless communication network over the control plane using EHC.

Another aspect of the disclosure provides a method of wireless communication for use by a wireless communication device. The method includes: sending a signal to a wireless communication network indicating the wireless communication device supports EHC for data transfer over a control plane; obtaining a response from the wireless communication network indicating the wireless communication network supports EHC for data transfer over the control plane; and communicating with the wireless communication network over the control plane using EHC.

Another aspect of the disclosure provides a network component of a wireless communication network. The network component includes a network interface and a processor coupled to the network interface, wherein the processor is configured to: obtain a signal from a wireless communication device indicating the wireless communication device supports EHC for data transfer over a control plane; send a response to the wireless communication device indicating the wireless communication network supports EHC for data transfer over the control plane; and communicate with the wireless communication device over the control plane using EHC.

Another aspect of the disclosure provides a method of wireless communication for use by a network component of a wireless communication network. The method includes: obtaining a signal from a wireless communication device indicating the wireless communication device supports EHC for data transfer over a control plane; sending a response to the wireless communication device indicating the wireless communication network supports EHC for data transfer over the control plane; and communicating with the wireless communication device over the control plane using EHC.

BRIEF DESCRIPTION OF THE DRAWINGS

FIG. 16 is a block diagram illustrating an example of a core network of a wireless communication network having various components configured to perform or control certain functions related to control plane data transfer with EHC.

FIG. 17 is a block diagram illustrating an example of a wireless communication device of a wireless communication network having various components configured to perform or control certain functions related to control plane data transfer with EHC.

DETAILED DESCRIPTION

Figure 1:
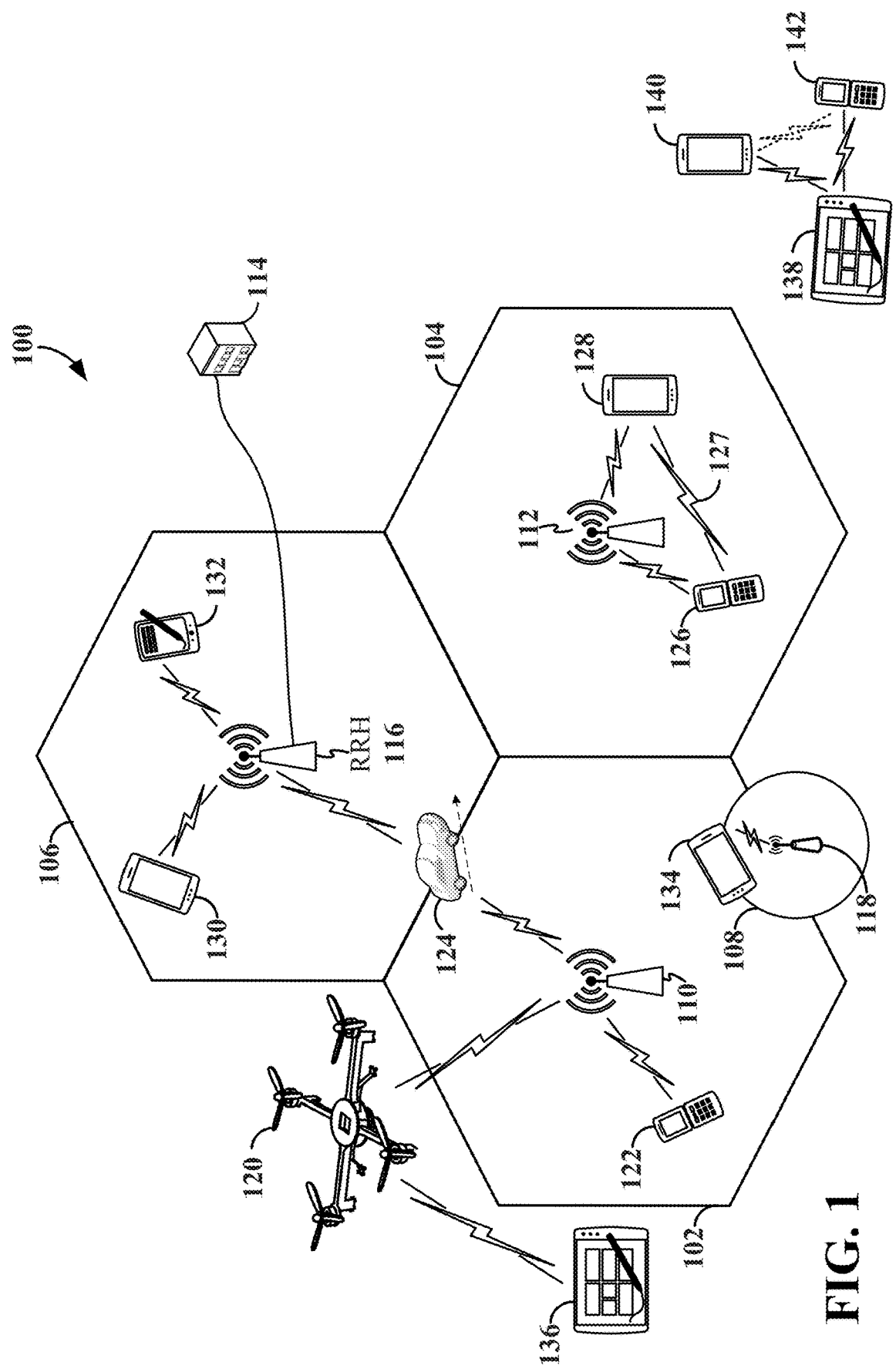
FIG. 1 is a diagram illustrating an exemplary wireless communication network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Some or all illustrated features may be omitted in a particular implementation within the scope of the present disclosure, and some illustrated features may not be required for implementation of all embodiments.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide various apparatus, methods, and systems to enable Ethernet Header Compression (EHC) for use with Ethernet data packets sent via a control plane of a wireless communication network. The control plane Ethernet data packets may be sent, for example, by user equipment (UE) handsets or other mobile devices. In this regard, a UE may be configured to request or otherwise negotiate with network components of the wireless communication network to use EHC for data sent via the control plane. Assuming the network components permit the use of EHC for Ethernet data packets sent via a control plane, the UE may then send data over the control plane within Ethernet data packets while using EHC to reduce the amount of data to be sent. This may serve to reduce data transfer latency or achieve other goals.

In illustrative examples, the UE notifies the wireless communication network that the UE supports EHC for data transfer over a control plane and then receives a response from the wireless communication network indicating the wireless communication network likewise supports EHC for data transfer over the control plane. The UE then sends a signal to the wireless communication network to request to use EHC for data transfer over the control plane. The UE sends the compressed Ethernet packets over the control plane only if the request is granted. Hence, in some examples, a two stage procedure is provided in which the UE first determines whether the wireless communication network supports EHC for data transfer over the control plane and, if the EHC feature is supported, the UE then requests to use the EHC feature, before actually sending any compressed Ethernet packets with data over the control plane.

In another aspects, complementary EHC features or functions are provided within a network component of the wireless communication network. For example, the network component receives a notification from a UE that the UE supports EHC for data transfer over a control plane and sends a response to the UE indicating the wireless communication network also supports EHC for data transfer over the control plane. Then the network component receives a signal from the UE requesting to use EHC for data transfer over the control plane. The network component authorizes the usage and then receives Ethernet packets with compressed headers from the UE over the control plane. The network component may also send Ethernet packets with compressed headers to the UE over the control plane. In some examples, the network component may include a mobility management function (AMF) and one or more session management functions (SMFs). Among other functions, the AMF selects a particular SMF, which then selects a field length for a context identification (ID) field for use with EHC for a protocol data unit (PDU) session for a particular Ethernet flow.

In the illustrative examples herein, the wireless communication network is configured in accordance with 3rd Generation Partnership Project (3GPP) New Radio (NR) specifications, often referred to as 5G. The capability to transfer data over the control plane of a 5G network may also be referred to as control plane Internet-of-Things (IoT) optimization, or cellular IoT (CIoT) optimization, although it is not limited for use with IoT devices and is applicable to a wide variety of UEs or other wireless communication devices.

Before discussing EHC in greater detail, an overview of a wireless communication system in which one of more UEs may be used is provided. The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable radio access technology (RAT) or RATs to provide radio access to a UE. As one example, the RAN 100 may operate according to 3GPP NR specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 100 may operate according to both the LTE and 5G NR standards. Of course, many other examples may be utilized within the scope of the present disclosure.

The geographic region covered by the RAN 100 may be divided into a number of cellular regions (cells) that can be uniquely identified by a UE based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a RAN responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the RAN 100 may include any number of wireless base stations and cells. Further, a relay node may be deployed to extend the size or coverage area of a given cell. The base stations 110, 112, 114, 118 provide wireless access points to a core network for any number of mobile apparatus.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the RAN. Various types of backhaul interfaces may be employed, such as a direct physical connection, a virtual network, or the like using any suitable transport network.

The RAN 100 is illustrated supporting wireless communication for multiple mobile apparatus. A mobile apparatus is commonly referred to as a UE in standards and specifications promulgated by 3GPP but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services. In examples where the RAN 100 operates according to both the LTE and 5G NR standards, the UE may be a eUTRAN-dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an IoT. A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing OFDM with a cyclic prefix. In addition, for UL transmissions, 5G NR specifications provide support for discrete Fourier transform-spread-OFDM (DFT-s-OFDM) with a cyclic prefix (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), OFDM, sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells.

Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is needed to access unlicensed spectrum, generally, any operator or device may gain access. Shared spectrum may fall between licensed and unlicensed spectrum, wherein technical rules or limitations may be needed to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138. The radio protocol architecture for a RAN, such as the RAN 100 shown in FIG. 1, may take on various forms depending on the particular application.

Figure 2:
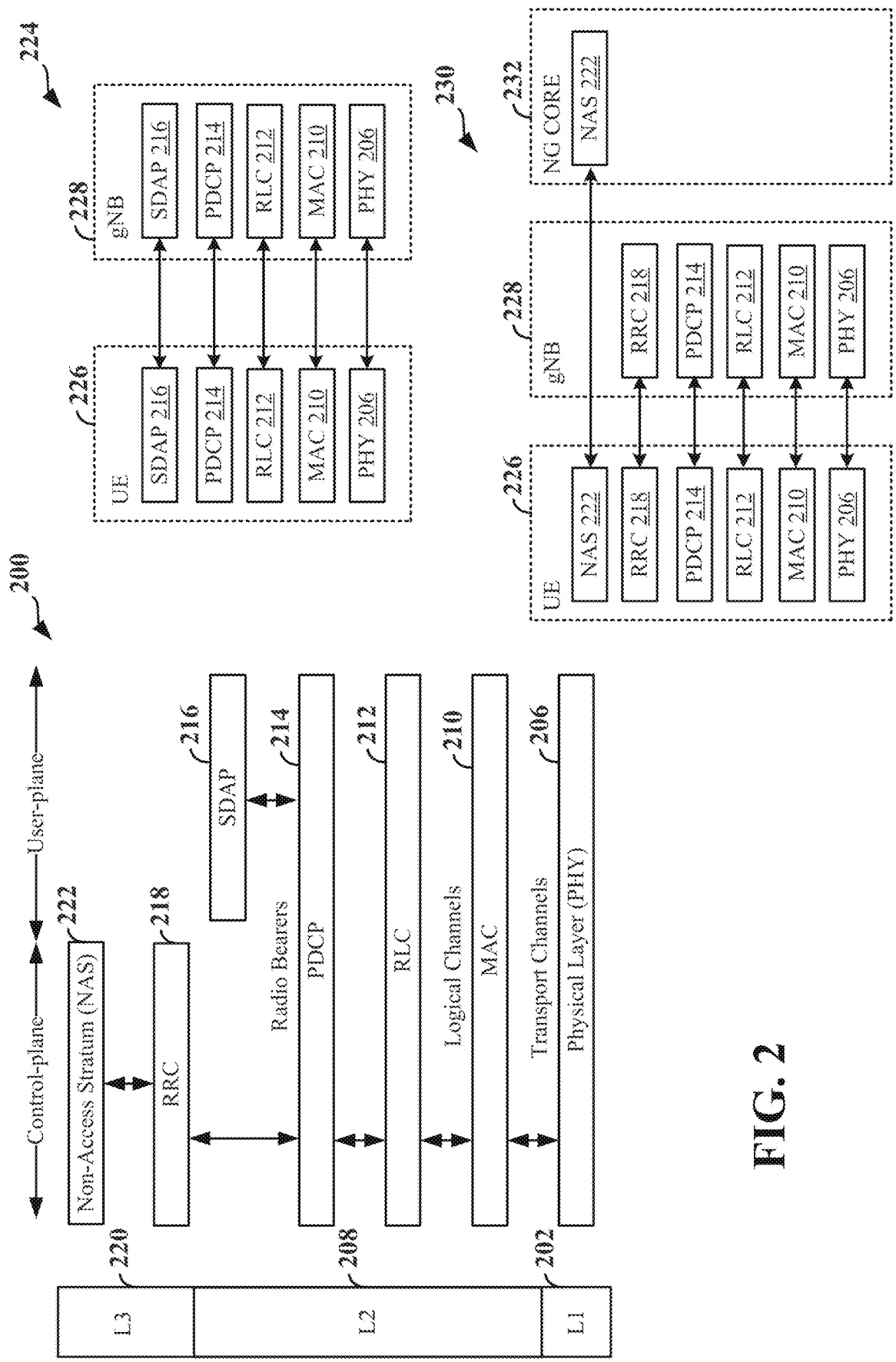
FIG. 2 is a diagram illustrating exemplary protocol stacks for a user plane and control plane for various devices of a wireless communication network.

Exemplary protocol stacks or radio protocol architectures for the user and control planes for 5G are illustrated in FIG. 2.

As illustrated in FIG. 2, the protocol architecture 200 for the UE and the base station includes three layers: Layer 1, Layer 2, and Layer 3. Layer 1 (L1 layer) 202 is the lowest layer and implements various physical layer signal processing functions. Layer 1 will be referred to herein as the physical layer 206. Layer 2 (L2 layer) 208 is above the physical layer 206 and is responsible for the link between the UE and base station over the physical layer 206. In the user plane, the L2 layer 208 includes a media access control (MAC) sublayer 210, a radio link control (RLC) sublayer 212, a packet data convergence protocol (PDCP) 214 sublayer, and a service data adaptation protocol (SDAP) sublayer 216, which are terminated at the base station on the network side. Although not shown, the UE may have several upper layers above the L2 layer 208 including at least one network layer (e.g., IP layer and user data protocol (UDP) layer) that is terminated at the User Plane Function (UPF) on the network side.

The SDAP sublayer 216 provides a mapping between a 5G core (5GC) QoS flow and a data radio bearer and performs QoS flow ID marking in both downlink and uplink packets. The PDCP sublayer 214 provides packet sequence numbering, in-order delivery of packets, retransmission of PDCP protocol data units (PDUs), and transfer of upper layer data packets to lower layers. The PDCP sublayer 214 also provides header compression for upper layer data packets to reduce radio transmission overhead, security by ciphering the data packets, and integrity protection of data packets. The RLC sublayer 212 provides segmentation and reassembly of upper layer data packets, error correction through automatic repeat request (ARQ), and sequence numbering independent of the PDCP sequence numbering. The MAC sublayer 210 provides multiplexing between logical and transport channels. The MAC sublayer 210 is also responsible for allocating the various radio resources (e.g., resource blocks) in one cell among the UEs and for HARQ operations. The physical layer 206 is responsible for transmitting and receiving data on physical channels (e.g., within slots).

In the control plane, the radio protocol architecture for the UE and base station is substantially the same for the physical layer 206 and the L2 layer 208 with the exception that in many systems there is no header compression function for the control plane. As will be explained, systems and methods for negotiating and performing Ethernet header compression within the control plane are provided herein. The control plane of FIG. 2 also includes a radio resource control (RRC) sublayer 218 in Layer 3 (layer 3) 220. The L3 layer 220 also includes non-access stratum (NAS) components 222. The RRC sublayer 218 is responsible for establishing and configuring signaling radio bearers (SRBs) and data radio bearers (DRBs) between the bases station the UE, paging initiated by the 5GC or NG-RAN, and broadcast of system information related to Access Stratum (AS) and NAS 222. The RRC sublayer 218 is further responsible for QoS management, mobility management (e.g., handover, cell selection, inter-RAT mobility), UE measurement and reporting, and security functions. The user plane portion of L3 220 may also include internet protocol (IP) components not shown.

FIG. 2 also provides a protocol stack diagram 224 illustrating the communication between corresponding protocol stack components of a UE 226 and a gNB 228 within the user plane. As shown via protocol stack diagram 224, the various user plane components of layers L1 and L2 of the UE 226 may communicate with corresponding components of the gNB 228 over the user plane. FIG. 2 also provides a protocol stack diagram 230 illustrating the communication between components of the UE 226, the gNB 228 and an NG core component 232 within the control plane. As shown, the various control plane components of layers L1 and L2 of the UE 226 may communicate with corresponding components of the gNB 228 over the control plane. Additionally, a Layer 3 NAS component of the UE 226 may communicate with a corresponding NAS component of the NG core 232, while bypassing the gNB 228. An exemplary NAS core component is a core access and mobility management function (AMF) component, which will be described next with reference to FIGS. 3 and 4. For the purposes of FIG. 2, it is noteworthy that a UE may communicate directly with NG core components via NAS control layer signaling within L3. This may include transfer of Ethernet packets via the control plane using EHC, as will be further explained.

Figure 3:
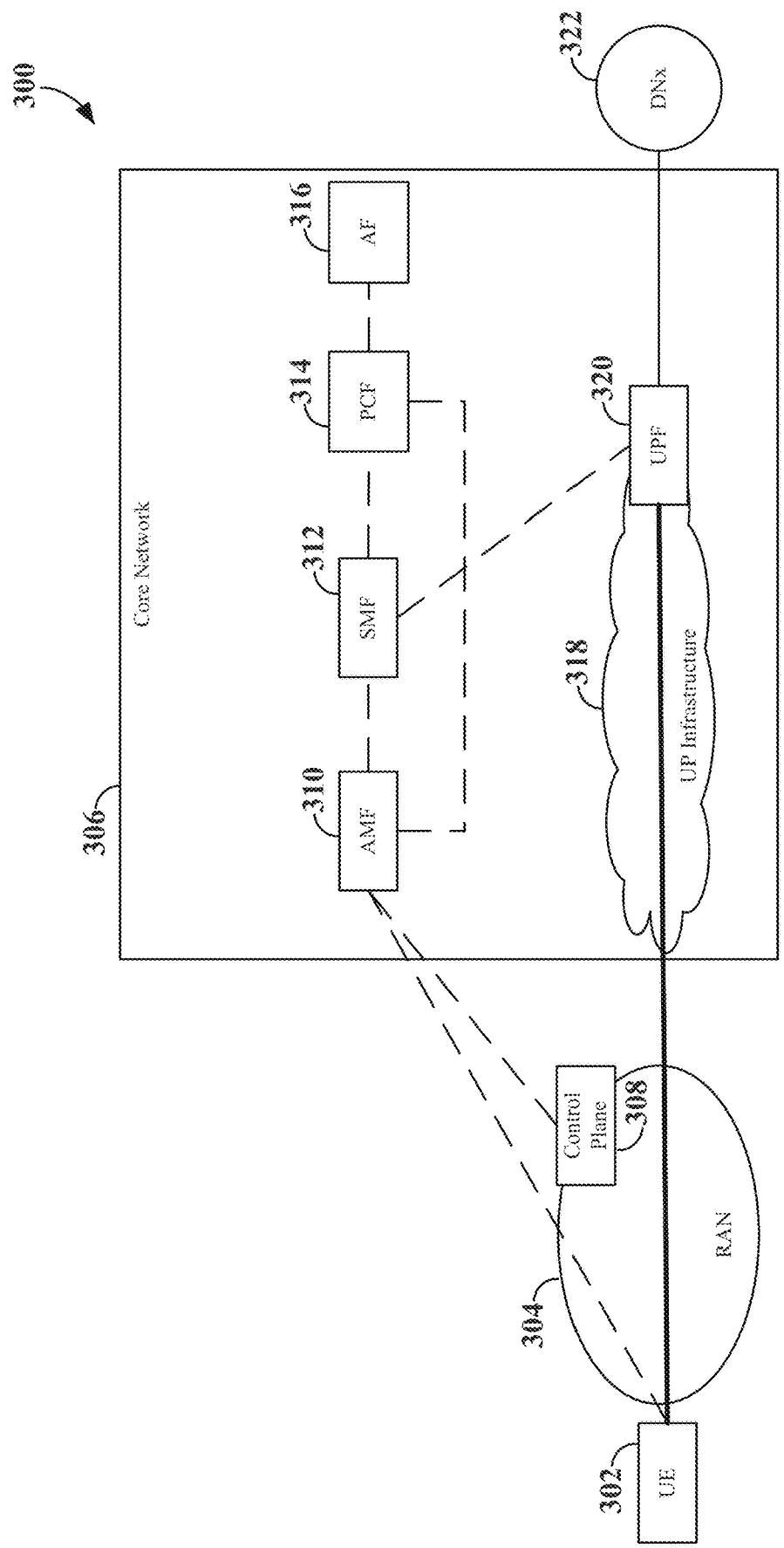
FIG. 3 is a diagram illustrating an example of a network architecture including selected non-access stratum (NAS) control plane components.
Figure 4:
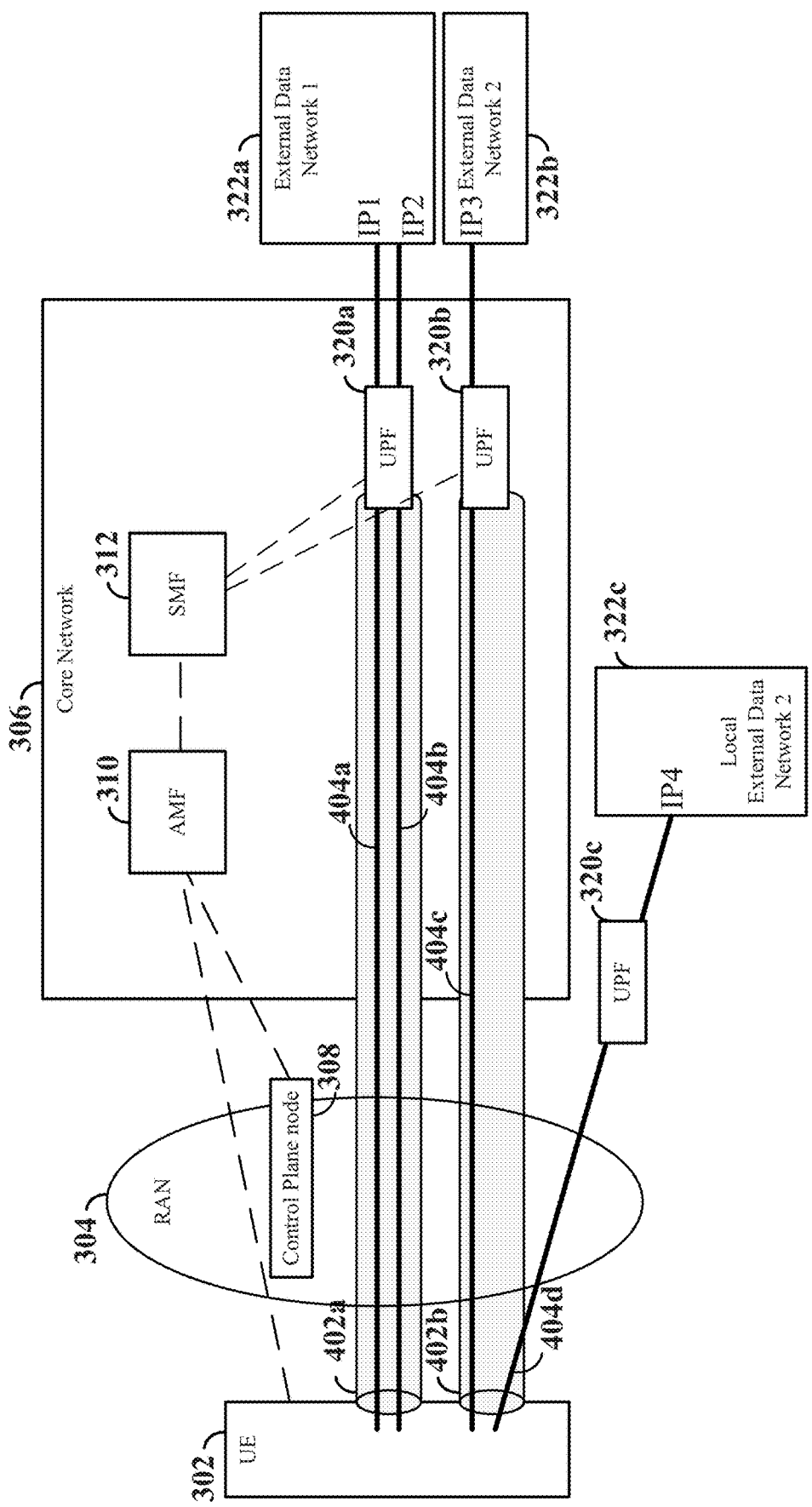
FIG. 4 diagram illustrating an example of communication utilizing protocol data unit (PDU) sessions.

FIGS. 3 and 4 are diagrams illustrating an example of a network architecture 300 of a next generation (e.g., 5G or NR) communication network. The network architecture 300 may include one or more UE 302, a next generation (e.g., 5G or NR) wireless RAN 304, and a next generation (e.g., 5G or NR) core network 306. In these examples, any signal path between the UE 302 and the core network 306 is presumed to be passed between these entities via the RAN 304, as represented by an illustrated signal path crossing the RAN 304. Here, the RAN 304 may be the RAN 100 described above and illustrated in FIG. 1. In the description that follows, when reference is made to the RAN 304 or actions performed by the RAN 304, it may be understood that such reference refers to one or more network nodes (e.g., gNBs) in the RAN 304 that is or are communicatively coupled to the core network 306 e.g., via one or more backhaul connections.

Both user plane and control plane functionality may be supported by the UE 302, the RAN 304 and the core network 306. The user plane carries the user data traffic, while the control plane primarily carries the signaling. As described in detail below, at least some Ethernet packet data traffic may be carried in the control plane with Ethernet data compression. In FIGS. 3 and 4, control plane signaling is indicated by dashed lines, while user plane connections are indicated by solid lines. Control plane signaling between the RAN 304 and the core network 306 is illustrated via a control plane node 308, which may be implemented, for example, in a RAN network node (e.g., a gNB) or distributed across two or more RAN network nodes (e.g., gNBs).

The wireless RAN 304 may be, for example, a 5G RAN, such as a NR RAN, or Evolved E-UTRAN (i.e., an E-UTRAN enhanced to natively connect to the next generation core network 306 with the same interface as the NR RAN). In other examples, the RAN 304 may be a next generation Wireless Local Area Network (WLAN), a next generation fixed broadband Internet access network or other type of next generation radio access network that utilizes a next generation RAT to access the next generation core network 306.

The core network 306 may include, for example, an AMF 310, a session management function (SMF) 312, a policy control function (PCF) 314, an application function (AF) 316, a user plane infrastructure 318, and a UPF 320. In some examples, the AF 316 may be located outside of the core network 306, i.e., within the application service provider's network. The AMF 310 provides mobility management, authentication, and authorization of UEs 302, while the SMF 312 processes signaling related to protocol data unit (PDU) sessions involving UEs 302 and allocates IP addresses to UEs 302. Each PDU session may include one or more data flows (e.g., IP, Ethernet and/or unstructured data flows), each associated with a particular application. The AF 316 provides information on data flows to the PCF 314, which is responsible for policy control, in order to support a respective QoS for each data flow. Thus, the AF 316 and PCF 314 may provide flow information defining the data flow and policy information (e.g., QoS information) associated with the data flow to the SMF 312 to configure one or more QoS flows within each PDU session.

The user plane infrastructure 318 facilitates routing of PDUs to and from UEs 302 via the RAN 304. PDUs may include, for example, IP packets, Ethernet frames and other unstructured data (i.e., Machine-Type Communication (MTC)). The UPF 320 is connected to the user plane infrastructure 318 to provide connectivity to external data networks 322. In addition, the UPF 320 may communicatively couple to the SMF 312 to enable the SMF 312 to configure the user plane connection over the core network 306.

To establish a PDU session with an external data network (DN) 322 via the next generation (5G) core network 306 and the next generation RAN 304, the UE 302 may transmit a PDU session establishment request message to the next generation core network 306 via the next generation RAN 304. The PDU session establishment request message may include a set of capabilities of the UE 302. In some examples, the set of capabilities may include Ethernet header compression capabilities of the UE.

The AMF 310 and/or SMF 312 may process the PDU session establishment request message based on the set of capabilities, a UE profile, network policies, flow information, and other factors. The AMF 310 and/or SMF 312 may then establish a PDU connection for the PDU session between the UE 302 and an external data network (DN) 322 over the RAN 304 and core network 306 via the user plane infrastructure 318. The PDU session may include one or more data flows and may be served by one or more UPFs 320 (only one of which is shown for convenience). Examples of data flows include, but are not limited to, IP flows, Ethernet flows and unstructured data flows.

The AMF 310 and/or SMF 312 may further use one or more of the set of capabilities, the UE profile, network policies, flow information, and other factors to select a QoS to be associated with one or more data flows within the PDU session. For example, the AMF 310 and/or SMF 312 may select one or more QoS parameters (e.g., Guaranteed Bit Rate (GBR) and/or specific QoS Class Identifiers (QCIs)) for one or more data flows within a PDU session.

FIG. 4 is a diagram illustrating an example of an example of communication utilizing multiple PDU sessions between a UE 302 and one or more external data networks 322. In the example shown in FIG. 4, the UE 302 is actively engaged in two PDU sessions 402a and 402b. Each PDU session 402a and 402b is a logical context in the UE 302 that enables communication between a local endpoint in the UE (e.g., a web browser) and a remote endpoint (e.g. a web server in a remote host) and each PDU connection may include one or more data flows (e.g., IP, Ethernet and/or unstructured data flows).

In the example shown in FIG. 4, PDU Session 402a is served by UPF 320a and includes two IP flows 404a and 404b, each terminated at a first external data network 322a (External Data Network 1) associated with a different IP address (IP1 and IP2) of the UE 302. PDU Session 402b also includes two IP flows 404c and 404d, each associated with a different IP address (IP3 and IP4) of the UE 302. However, IP flow 404c is served by UPF 320b and terminated at a second external data network 322b (External Data Network 2), while IP flow 404d is served by a local UPF 320c and terminated at a local endpoint of the second external data network 322c (Local External Data Network 2). The session management context (e.g., leveraging software defined networking (SDN) and signaling routing) for PDU Session 402a and PDU session 402b is provided in the SMF 312. The user plane context (e.g., QoS, tunneling, etc.) for PDU Session 402a is provided in the UPF 320a, while the user plane context for PDU Session 402b is provided in both UPF 320b and local UPF 320c.

Further information regarding a core network and its components may be found in ETSI TS 124 501 V15.0.0 (2018-07) 5G, Non-Access-Stratum (NAS) protocol for 5G System (5GS), Stage 3 (3GPP TS 24.501 version 15.0.0 Release 15). It is noted that the core network described therein does not provide for data transfer over a control plane while also providing EHC, a feature described herein.

Figure 5:
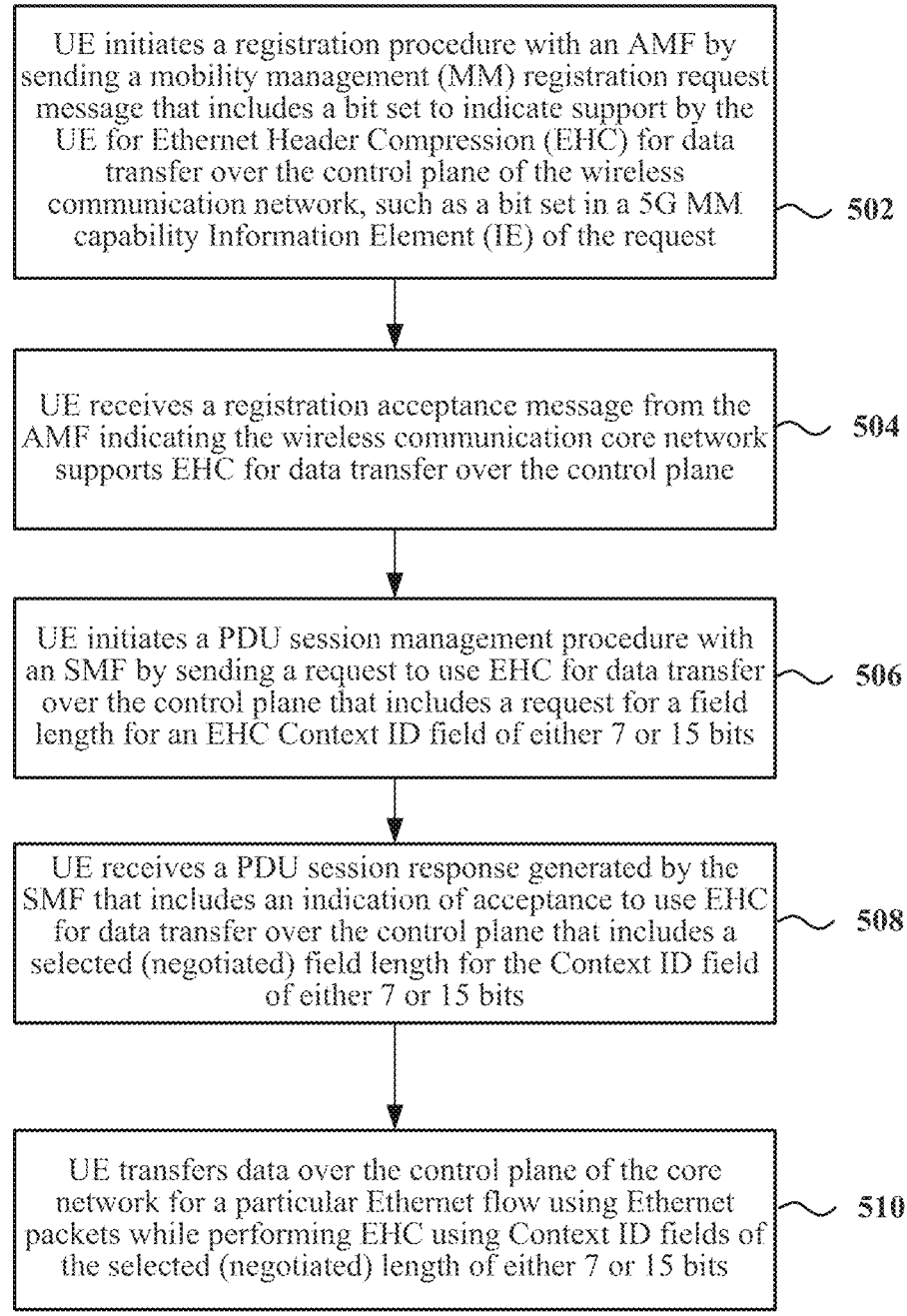
FIG. 5 is a flow chart of an exemplary method performed by a user equipment (UE) for negotiating with components of a core network to use EHC for data transfer over a NAS control plane.

FIG. 5 is a flow chart 500 of a method for use by a UE or other wireless communication device in the network of FIGS. 1-4 where the core network is configured to permit Ethernet packet transmission through its control plane.

Beginning at block 502, the UE initiates a registration procedure with an AMF of the network by sending a mobility management registration request message that includes a bit set to indicate support by the UE for EHC for data transfer over the control plane of the wireless communication network. For 5G mobility management (5GMM), the registration request message may include an information element (IE) that specifies capabilities and a bit within the IE may be set to one value (e.g., 1) to indicate the UE has EHC capability and set to another value (e.g. 0) to indicate that the UE has no EHC capability. Here it is noted that a separate bit (not shown) within the IE of the registration request message also may be set to indicate support for header compression of IP packets (IPHC). Hence, in one example, 5G MM standards may be drafted or revised to define a modified IE that includes both a legacy IPHC capability bit and a new EHC capability bit.

At block 504, the UE receives a registration acceptance message (assuming registration is accepted) from the AMF that includes an indicator to indicate the wireless communication core network supports EHC for data transfer over the control plane (assuming, also, that the network does indeed support EHC for data transfer over the control plane). For 5G MM, the IE of the registration acceptance message may include a bit set by the AMF to indicate EHC capability. (Again, a separate bit, not shown, within the IE may be set to indicate support for header compression of IP packets.)

At block 506, the UE initiates a PDU session management (SM) procedure with the SMF of the network by sending a PDU session establishment/modification request message to the SMF that requests to use EHC for data transfer over the control plane and includes a request for a field length for an EHC Context ID field of either 7 or 15 bits. For 5G SM, the Context ID may be a parameter associated with each compressed data flow that identifies the compressed header of a packet stream. During actual transference of compressed data, the Context ID is transmitted instead of the compressed headers. In one example, the 5G SM standards may be drafted or revised to define a new IE in the PDU session establishment/modification request message for the UE to request EHC for the PDU session and to request a specific Context ID field length. If the session management function SMF accepts EHC for the PDU session, it responds with the Context ID length in the PDU session establishment/modification acceptance/command message.

At block 508, the UE receives a PDU session management response generated by the SMF that includes an indication of acceptance to use EHC for data transfer over the control plane that includes a selected (negotiated) field length for the Context ID field of either 7 or 15 bits. It is note that the indication of acceptance is for a particular Ethernet flow, where a particular Ethernet flow refers to Ethernet packet exchanges between a particular Ethernet source-destination address pair.

At block 510, the UE then transfers data over the control plane of the core network for a particular Ethernet flow using Ethernet packets while performing EHC using Context ID fields of the selected (negotiated) length of either 7 or 15 bits. Referring back to FIG. 4, the Ethernet packets may be sent, for example, from the UE 302 through the AMF 310 and the SMF 312 to at UPF 320 and then to an external network 322. In other examples, the Ethernet packets may be sent from the UE 302 through the AMF 310 to a control plane node 308. A different Context ID is used for each particular Ethernet flow.

Figure 6:
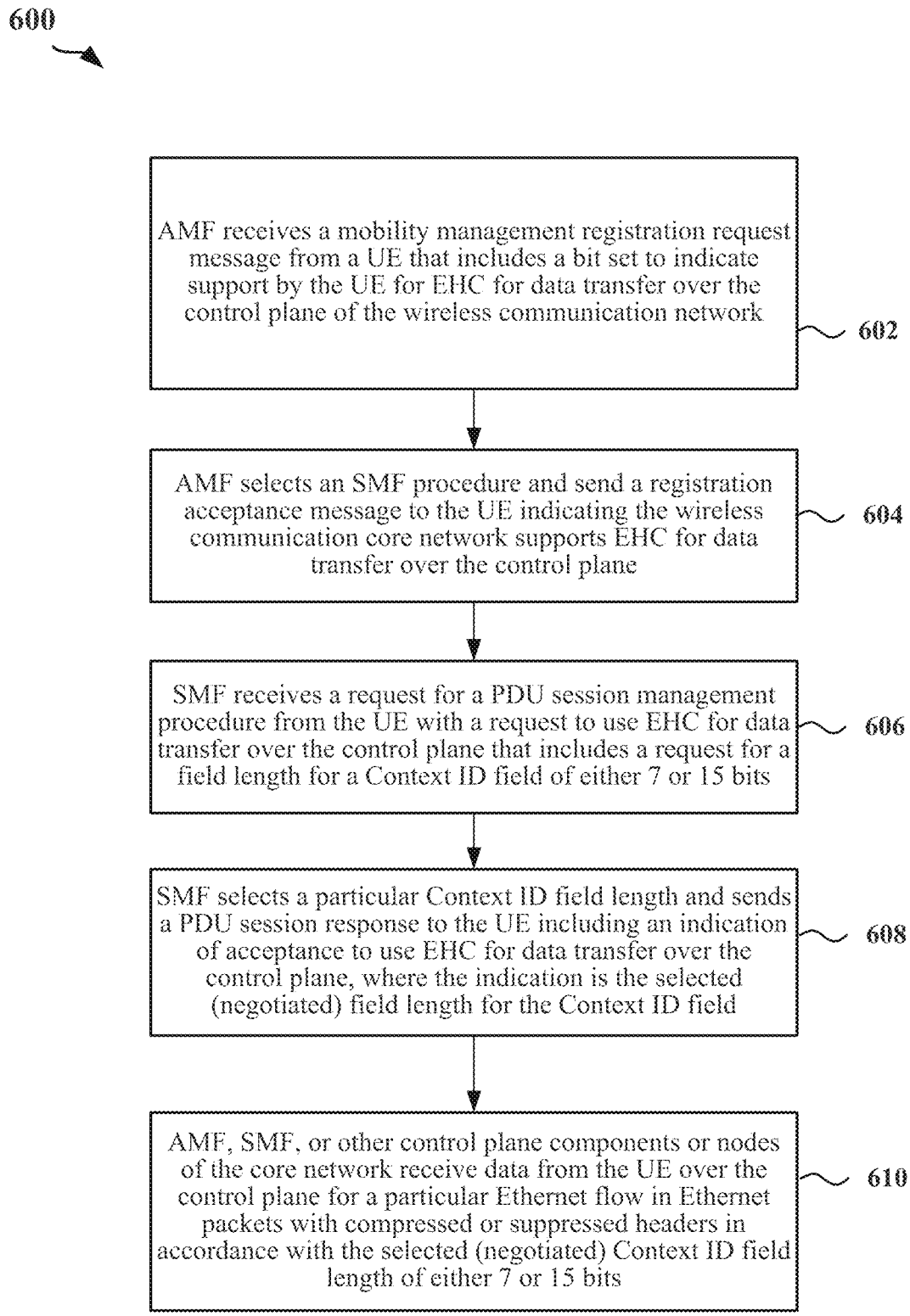
FIG. 6 is a flow chart of an exemplary method performed by a network component in communication with a UE to permit and perform EHC for data transfer over a NAS control plane.

FIG. 6 is a flow chart 600 of a method for use by the core network of FIGS. 1-4 to permit Ethernet packet transmission through the control plane by the UE.

Beginning at block 602, an AMF receives a mobility management registration request from the UE that includes a bit set to indicate support by the UE for EHC for data transfer over the control plane of the wireless communication network. As explained above with reference to FIG. 5, the bit may be set with an IE of the mobility management registration request.

At block 604, the AMF selects an SMF procedure for use with the request and then sends a registration acceptance message (assuming registration is accepted) to the UE that includes an indicator to indicate the wireless communication core network supports EHC for data transfer over its control plane (assuming, again, that the core network does indeed support EHC for data transfer over its control plane).

At block 606, the SMF of the core network receives a request from the UE for PDU session management (via a PDU session establishment/modification request message) where the request message includes a request to use EHC for data transfer over the control plane and includes a request for a field length for an EHC Context ID field of either 7 or 15 bits.

At block 608, the SMF selects a particular Context ID field length (either 7 or 15 bits) and sends a PDU session management response to the UE that includes an indication of acceptance to use EHC for data transfer over the control plane that includes the selected (negotiated) field length for the Context ID field.

At block 610, the AMF, SMF or other control plane components or nodes of the core network receive data from the UE over the control plane for a particular Ethernet flow in Ethernet packets with compresses or suppressed headers in accordance with the selected (negotiated) Context ID field length of either 7 or 15 bits. As noted, a different Context ID is used for each particular Ethernet flow.

Figure 7:
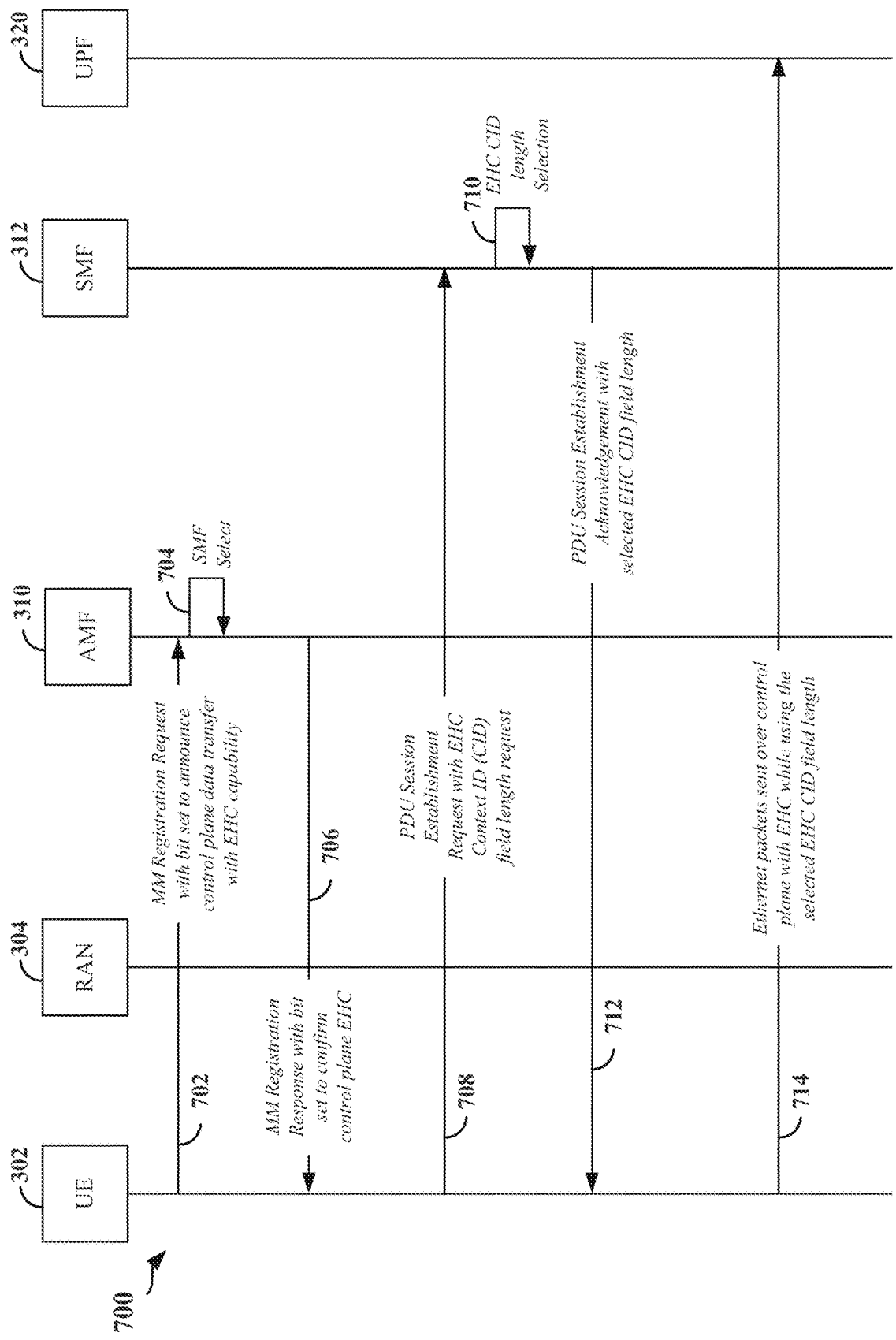
FIG. 7 is a signaling diagram illustrating exemplary signaling for enabling and performing data transfer with EHC over a NAS control plane.

FIG. 7 is a signaling or timing diagram 700 illustrating exemplary signaling for announcing and negotiating EHC for a PDU session. At 702, a UE 302 may generate and transmit a mobility management registration request message that includes a bit set to announce that the UE has EHC capability for data transmission over the control plane. The mobility management registration request message may be routed through the RAN 304 to the AMF 310. At 704, the AMF 310 responds by selecting an SMF and then, at 706, sends a mobility management registration request acceptance that includes a bit set to confirm that the AMF and other components of the core network have EHC capability. At 708, the UE 302 generates and sends a PDU session establishment request message with a request for a length of an EHC Context ID field. As noted, the request for the length may be within an IE of the PDU session establishment request message. The PDU session establishment request message may be routed through the RAN 304 and the AMF 310 to the selected SMF 312.

At 710, the SMF 312 responds by choosing a length for the Context ID field (e.g. either 7 bits or 15 bits) and then, at 712, sends a PDU session establishment acknowledgment to the UE 302 that includes the selected length for the Context ID field. The PDU session establishment acknowledgment may be routed through the AMF 310 and the RAN 304 to the UE 302. At 714, the UE 203 sends Ethernet packets over control plane of the core network while employing EHC and while using the selected EHC Context ID field length for the Context ID provided with the packets. In the example of FIG. 7, the Ethernet packets are sent over control plane of the core network while employing EHC and while using the selected EHC Context ID field length for the Context ID provided with the packets. In the example of FIG. 7, the Ethernet packets are sent to a UPF 320 (via the RAN 304, the AMF 310, and the selected SMF 312), which may forward the packets to an external network (such as an external network 322 of FIG. 4). In other examples, the Ethernet packets may be sent to other components of the core network. Note that additional components of the core network 306 of FIG. 4 may be involved in the establishment and processing of PDU sessions. FIG. 7 is intended to highlight various functions and operations that are particularly relevant to EHC negotiation, while omitting other details of a practical core network.

Figure 8:
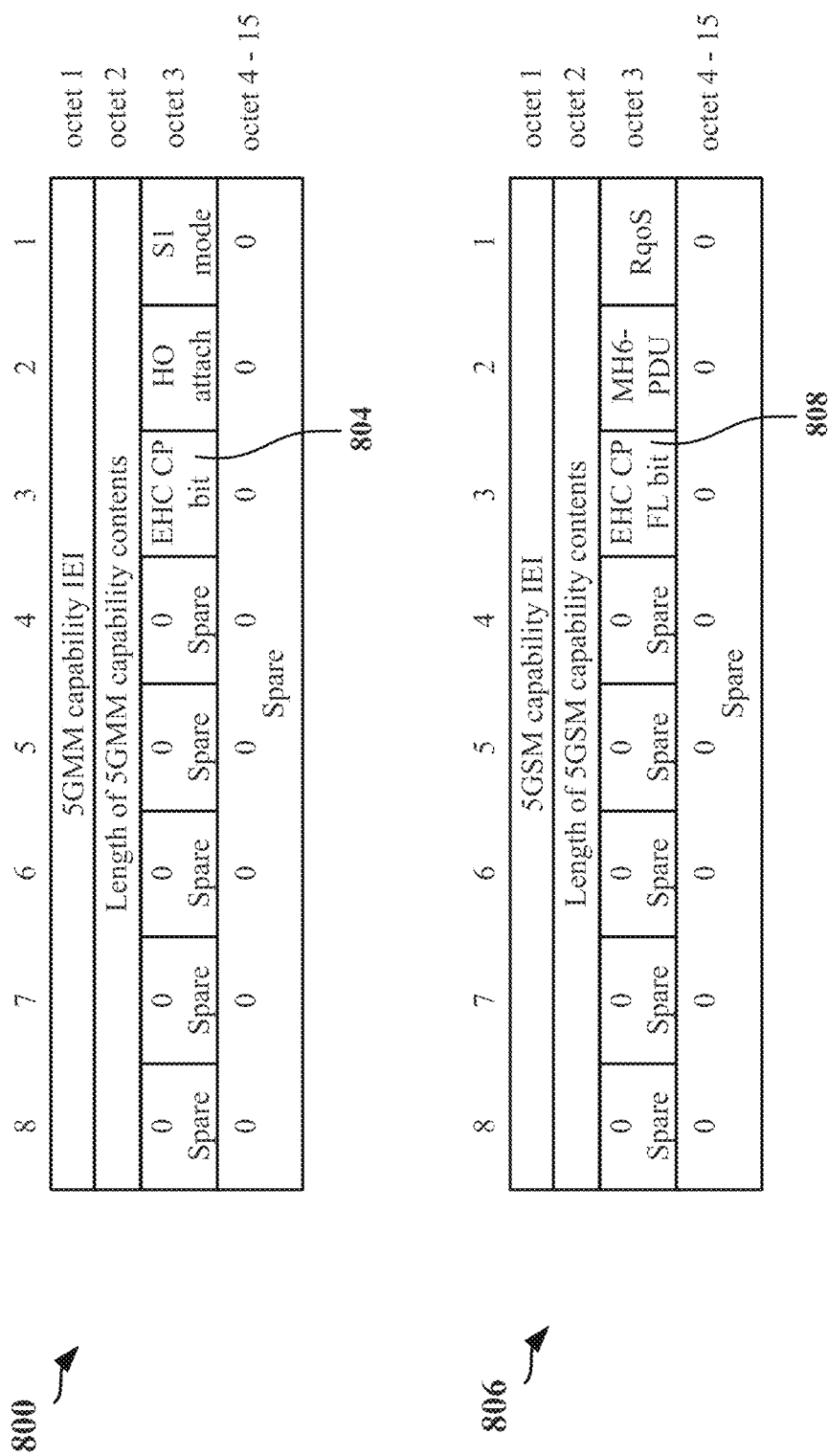
FIG. 8 includes data format diagrams illustrating exemplary formats for a 5G mobility management information element (IE) and a 5G session management IE.

FIG. 8 illustrates an exemplary 5G MM capability IE 800 that includes a bit 804 that may be set by the UE to announce to the MM components of the core network (such as the AMF 310 of FIG. 7) that the UE is configured for EHC of data transmitted over the control plane of the core network. The bit is referred to in the figure as an "EHC CP" bit, since it indicates UE support for EHC for control plane data packet transmissions. In the particular example of FIG. 8, a third bit within octet 3 of the IE is 800 used as the EHC CP bit (with the applicable 3GPP 5G MM standards specified so the core network recognizes the bit as indicating UE support for control plane EHC), but other bit locations within the IE 800 may instead be designated within the standards. In some examples, an IE with the bit set to "1" may be included in a 5G MM registration request sent from the UE to the AMF 310 at 702 of FIG. 7. The various other portions of the IE 800, such as its 5G MM capability IE indicator (IEI), may be the same as in predecessor versions of the corresponding 3GPP 5G MM standards.

FIG. 8 also illustrates an exemplary 5G SM capability IE 806 that includes a bit 808 that may be set by the UE to announce to the SM components of the core network (such as the SMF 312 of FIG. 7) that the UE is configured for EHC of data transmitted over the control plane of the core network and that the UE is requesting a field length for the EHC Context ID (of either 7 or 15 bits). The bit is referred to in the figure as an "EHC FL CP" bit, since it serves to request a field length (FL) for the Context ID for EHC for control plane (CP) data packet transmissions. In this example, by requesting the SMF to provide a field length for the Context ID for EHC, the UE is thus also signaling to the SMF that it is requesting to use EHC (since, otherwise, no EHC Context ID would be needed). In this manner, the UE does not have to provide within its request for session management both an indicator requesting to use EHC and a separate indicator requesting the field length for the Context ID for EHC.

In the particular example of FIG. 8, a third bit within octet 3 of the IE is 806 used as the EHC FL CP bit (with the applicable 3GPP 5G SM standards specified so the core network recognizes the bit as indicating UE support for control plane EHC and that the UE is requesting the Context ID field length), but other bit locations within the IE 806 may instead be designated within the standards. In some examples, an IE with the bit set to "1" may be included in a 5G SM PDU session establishment request sent from the UE to the SMF 312 at 708 of FIG. 7. The various other portions of the IE 806, such as its 5G MM capability IE indicator (IEI), may be the same as in predecessor versions of the corresponding 3GPP 5G SM standards. As already explained, if the SMF 312 agrees to enable EHC for data packets sent over the control plane of the core network, the SMF 312 responds to the PDU session establishment request from the UE with by choosing the length for the Context ID field and then sending a PDU session establishment acknowledgment to the UE that includes the selected (negotiated) length for the Context ID field.

Figure 9:
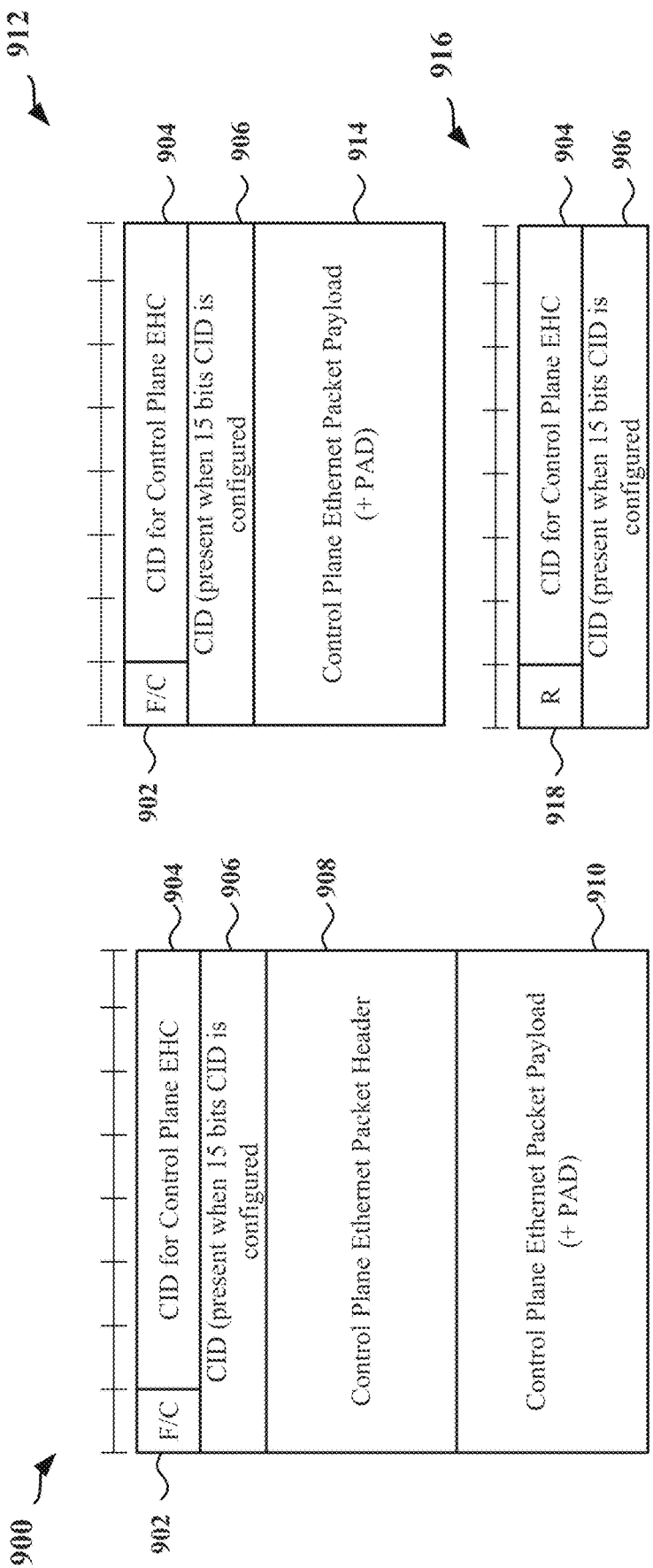
FIG. 9 includes data format diagrams illustrating exemplary formats for Ethernet packets with Ethernet headers and with Ethernet headers suppressed using EHC.

FIG. 9 illustrates an exemplary format for an initial full (uncompressed) Ethernet packet 900 sent by a UE over the control plane of the core network, where the initial packet includes an uncompressed Ethernet header. The initial packet may be, for example, the first packet of a sequence of packets for a current PDU session for a particular Ethernet flow. The full (uncompressed) packet 900 includes an F/C bit 902 within its first octet that indicates whether the packet is full or uncompressed. Since packet 900 is a full packet, the bit may be set to indicate a full packet by, for example, setting the bit value to "1." Packet 900 also includes a Context ID for control plane EHC, which may be either 7 or 15 bits (as selected by the SMF). If the field length for the Context ID for control plane EHC is 7 bits, then the entire Context ID 904 is stored or encoded with remaining seven bits of the first octet. If the field length for the Context ID for control plane EHC is 15 bits, then the remainder of the Context ID for control plane EHC 906 is stored or encoded with eight bits of the second octet. The control plane Ethernet packet header 908 is then provided, followed by a first portion of the control plane Ethernet packet payload 910 being transmitted for the particular Ethernet Flow (e.g. data), along with any padding that might be included.

FIG. 9 also illustrates an exemplary format for a subsequent compressed Ethernet packet 912 sent by a UE over the control plane of the core network, where the subsequent packet omits the Ethernet header (thereby compressing or suppressing the header). The subsequent packet may be, for example, a second packet of a sequence of packets for a current PDU session for a particular Ethernet flow. The compressed packet format 912 again includes an F/C bit 902 within its first octet that indicates whether the packet is full or uncompressed. Since packet 912 is a compressed packet, the bit may be set to indicate a compressed packet by, for example, setting the bit value to "0." Packet 912 also includes the same Context ID for control plane EHC as the initial uncompressed packet 902. Again, if the field length for the Context ID for control plane EHC is 7 bits, the entire Context ID 904 is stored or encoded with remaining seven bits of the first octet of the packet. If the field length for the Context ID is 15 bits, the remainder of the Context ID 906 is stored or encoded with eight bits of the second octet. The control plane Ethernet packet header 908 is then omitted. Instead, the next portion 914 of the packet 912 provides the next (second) portion of the control plane Ethernet packet payload being transmitted for the particular Ethernet Flow (e.g. data), along with any padding that might be included.

FIG. 9 also illustrates an exemplary format for a subsequent return or feedback Ethernet packet 916 sent back to the UE over the control plane of the core network. The feedback packet may be, for example, sent (by a receiving device) in reply to the first packet 902 of the sequence of packets for a current PDU session for a particular Ethernet flow, so as to acknowledge receipt of the first packet 902. The feedback packet format 916 includes a return bit (R) 918 within its first octet that indicates that the packet is a feedback packet. Packet 916 also includes the same Context ID for control plane EHC as the forward packet 902. Again, if the field length for the Context ID for control plane EHC is 7 bits, the entire Context ID 904 is stored or encoded within remaining seven bits of the first octet of the packet. If the field length for the Context ID is 15 bits, the remainder of the Context ID 906 is stored or encoded with eight bits of the second octet. For a return packet, no headers and no payload are included.

Figure 10:
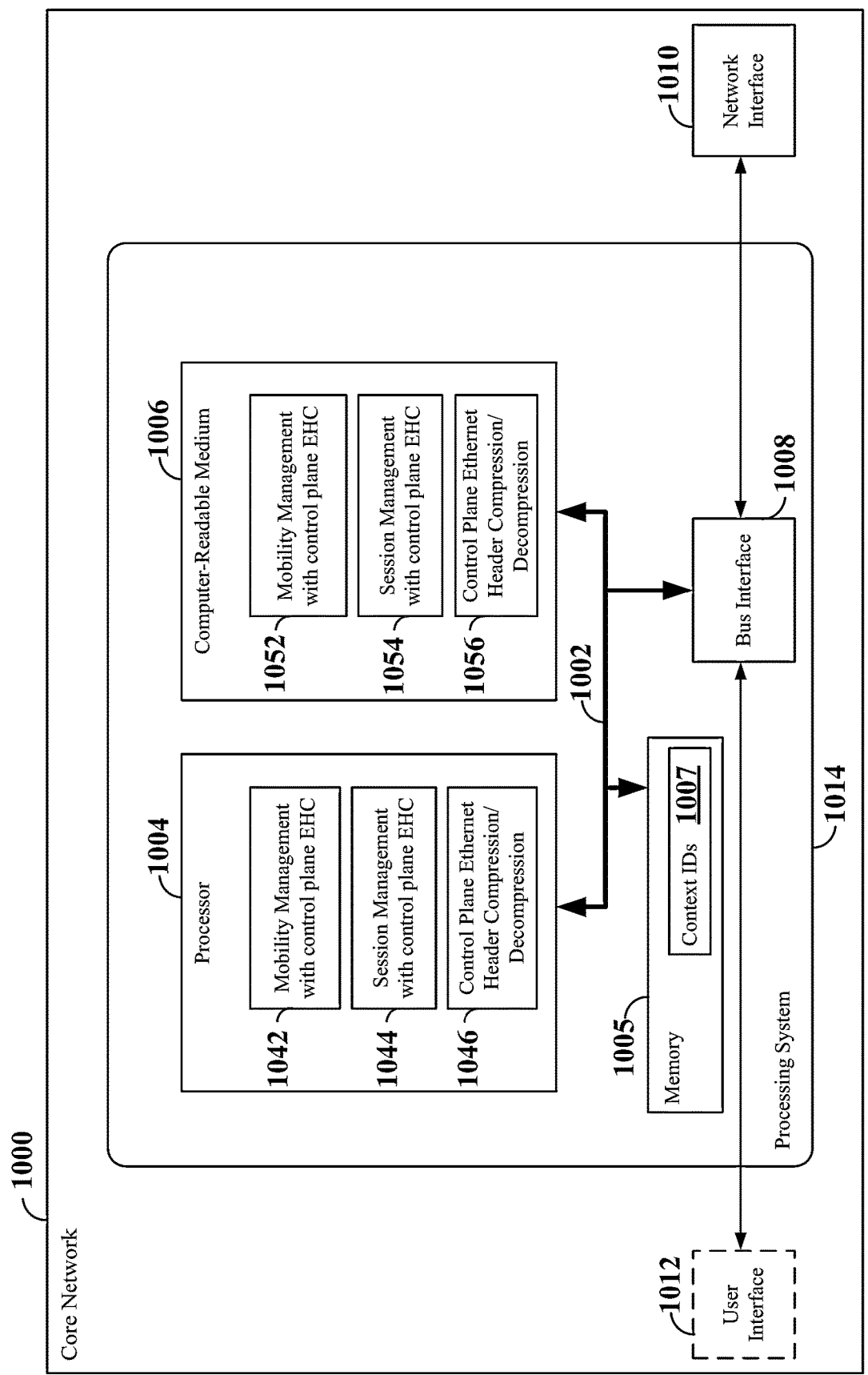
FIG. 10 is a block diagram illustrating an example of a hardware implementation for an NAS core network node employing a processing system.

FIG. 10 is a block diagram illustrating an example of a hardware implementation for a core network 1000 employing a processing system 1014. For example, the core network may correspond to a network that includes the AMF and SMF components shown and described above in reference to FIGS. 3, 4, and/or 7.

The core network 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the core network 1000 may be configured to perform any one or more of the functions described herein. That is, the processor 1004, as utilized in the core network 1000, may be used to implement any one or more of the processes and procedures described herein.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a network interface 1010 (or wireless communication interface or transceiver). The network interface 1010 provides a means for communicating with various other apparatus over a transmission medium, such as UEs. Depending upon the nature of the apparatus, a user interface 1012 (e.g., keypad, display, touch screen, speaker, microphone, joystick) may also be provided. Of course, such a user interface 1012 is optional, and may be omitted in some examples.

The processor 1004 is responsible for managing the bus 1002 and general processing, including the execution of software stored on the computer-readable medium 1006. Software should be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. In some core networks, different functions may be performed by different components or nodes within the network, and so separate processors may be provided within the different nodes for performing different functions. For convenience and generality, the processor 1004 of FIG. 10 is shown as having a set of processing components or circuits, such as both mobility management and session management components. In a practical system, these processing components or circuits may be provided within separate nodes.

In the example of FIG. 10, the processor 1004 may include mobility management circuitry 1042 configured for use with control plane EHC. The mobility management circuitry 1042 may be configured to receive and process a mobility management registration request received from a UE, wherein the request includes an indication that the UE is configured for control plane EHC. Among other tasks, the mobility management circuitry 1042 may select a particular SMF for use with the UE. The mobility management circuitry 1042 may further be configured to execute mobility management software 1052 included on the computer-readable medium 1006 to implement one or more functions described herein, including functions supporting mobility management for control plane EHC.

The processor 1004 may also include session management circuitry 1044 configured for use with control plane EHC. The session management circuitry 1044 may be configured to receive and process a PDU session establishment request message from a UE. The PDU session establishment request message may contain a set of capabilities of the UE. The set of capabilities may include, for example, an indication that the UE is configured for control plane EHC.

The PDU session establishment request message may also include a request for a field length of a Context ID for use with control plane EHC. The session management circuitry 1044 may process the PDU session establishment request message based on the UE capabilities, a UE profile (maintained at a particular core network node or retrieved from another core network node), UE subscription information, network policies, flow information, and other factors. The session management circuitry 1044 may then establish a PDU connection between the UE and an external data network over the NG RAN via an NG core network that permits and supports EHC. The session management circuitry 1044 may further be configured to execute session management software 1054 included on the computer-readable medium 1006 to implement one or more functions described herein, including functions supporting session management for control plane EHC.

The processor 1004 may further include control plane Ethernet header compression/decompression circuitry 1046 configured to compress at least some Ethernet packets sent by the core network 1000 via the control plane and/or decompress at least some Ethernet packets received by the core network 1000. The Ethernet header compression/decompression circuitry 1046 may further be configured to execute Ethernet header compression/decompression software 1056 included on the computer-readable medium 1006 to implement one or more functions described herein, including functions supporting compression/decompression of Ethernet headers within Ethernet packets transmitted via the control plane of the core network. To facilitate EHC, the control plane Ethernet header compression/decompression circuitry 1046 may store context IDs 1007 within a portion of memory 1005 for various Ethernet flows.

Figure 11:
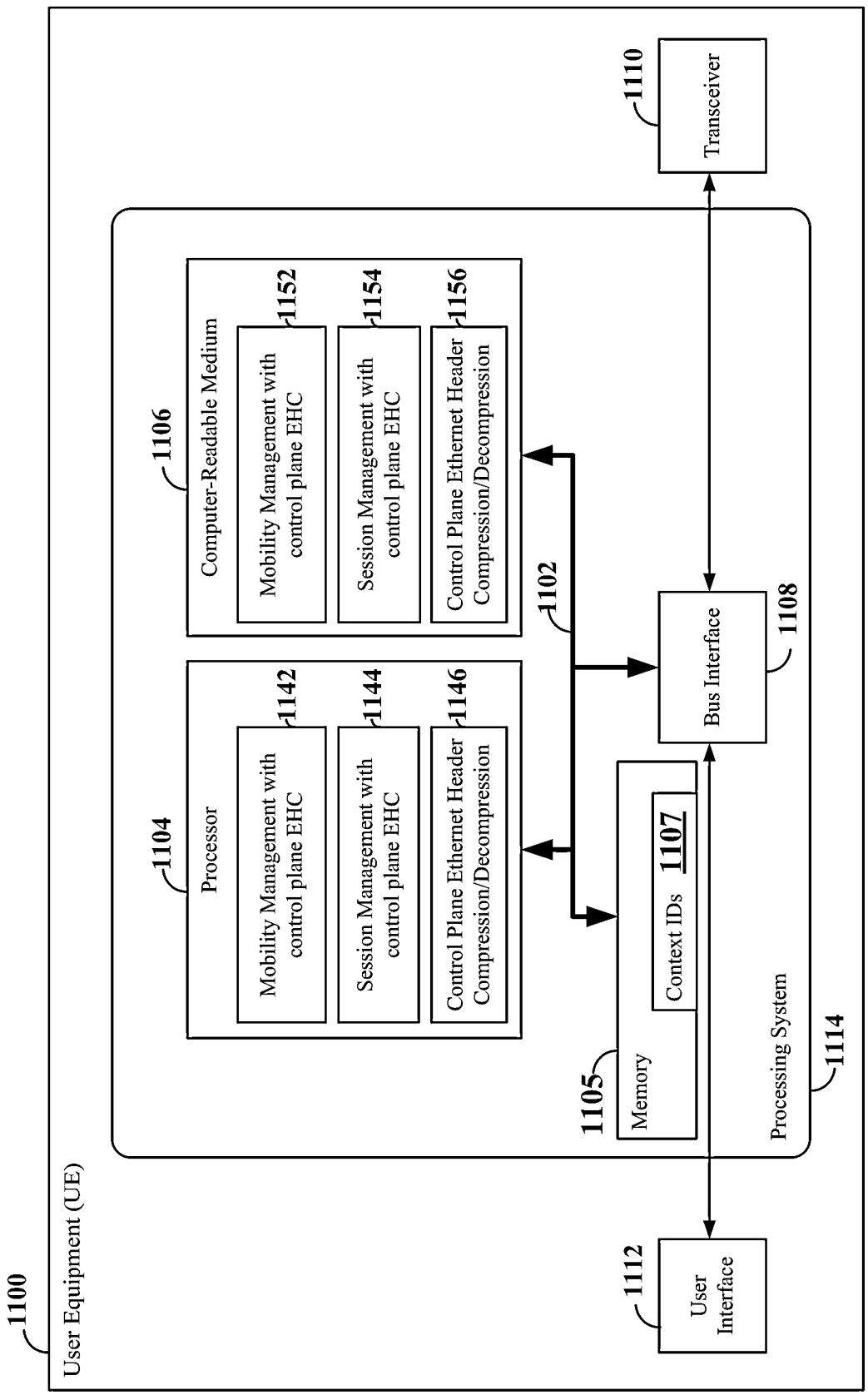
FIG. 11 is a block diagram illustrating an example of a hardware implementation for a UE employing a processing system.

FIG. 11 is a diagram illustrating an example of a hardware implementation for an exemplary UE 1100 employing a processing system 1114 that includes one or more processors 1104. For example, the UE may correspond to any of the UEs illustrated in FIGS. 1, 3, 4, and/or 7.

The overall architecture of the processing system 1114 may be similar to the processing system 1014 illustrated in FIG. 10, including a bus interface 1108, a bus 1102, memory 1105, a processor 1104, and a computer-readable medium 1106. Furthermore, the UE 1100 may include a user interface 1112 and a transceiver 1110 for communicating with various other apparatus over a transmission medium (e.g., an air interface for communicating with base stations). The processor 1104, as utilized in a UE 1100, may be used to implement any one or more of the processes described herein.

In some aspects of the disclosure, the processor 1104 may include circuitry configured for various functions. For example, the processor 1104 may include mobility management circuitry 1142 configured for use with control plane EHC. The mobility management circuitry 1142 may be configured to generate and send a mobility management registration request to a core network node, such as core network 1000 of FIG. 10, wherein the request includes an indication that the UE is configured for control plane EHC. The mobility management circuitry 1142 may further be configured to execute mobility management software 1152 included on the computer-readable medium 1106 to implement one or more functions described herein, including functions supporting mobility management for control plane EHC.

The processor 1104 may also include session management circuitry 1144 configured for use with control plane EHC. The session management circuitry 1144 may be configured to generate and send a PDU session establishment request message to a core network node, such as core network 1000 of FIG. 10. As explained above, the PDU session establishment request message may contain a set of capabilities of the UE such as an indication the UE is configured for control plane EHC. The PDU session establishment request message may also include a request for a field length of a Context ID for use with control plane EHC. The session management circuitry 1144 may process a PDU session establishment acknowledgement received from the core network that acknowledges the establishment of a PDU connection between the UE and an external data network over the NG RAN via an NG core network that permits and supports EHC. The session management circuitry 1144 may further be configured to execute session management software 1154 included on the computer-readable medium 1106 to implement one or more functions described herein, including functions supporting session management for control plane EHC.

The processor 1104 may further include control plane Ethernet header compression/decompression circuitry 1146 configured to compress at least some Ethernet packets sent over the control plane and/or decompress at least some Ethernet packets received over the control plane of the core network. The Ethernet header compression/decompression circuitry 1146 may further be configured to execute Ethernet header compression/decompression software 1156 included on the computer-readable medium 1106 to implement one or more functions described herein, including functions supporting compression/decompression of Ethernet headers within Ethernet packets transmitted via the control plane of the core network. To facilitate EHC, the control plane Ethernet header compression/decompression circuitry 1146 may store context IDs 1107 within a portion of memory 1105 for various Ethernet flows.

Figure 12:
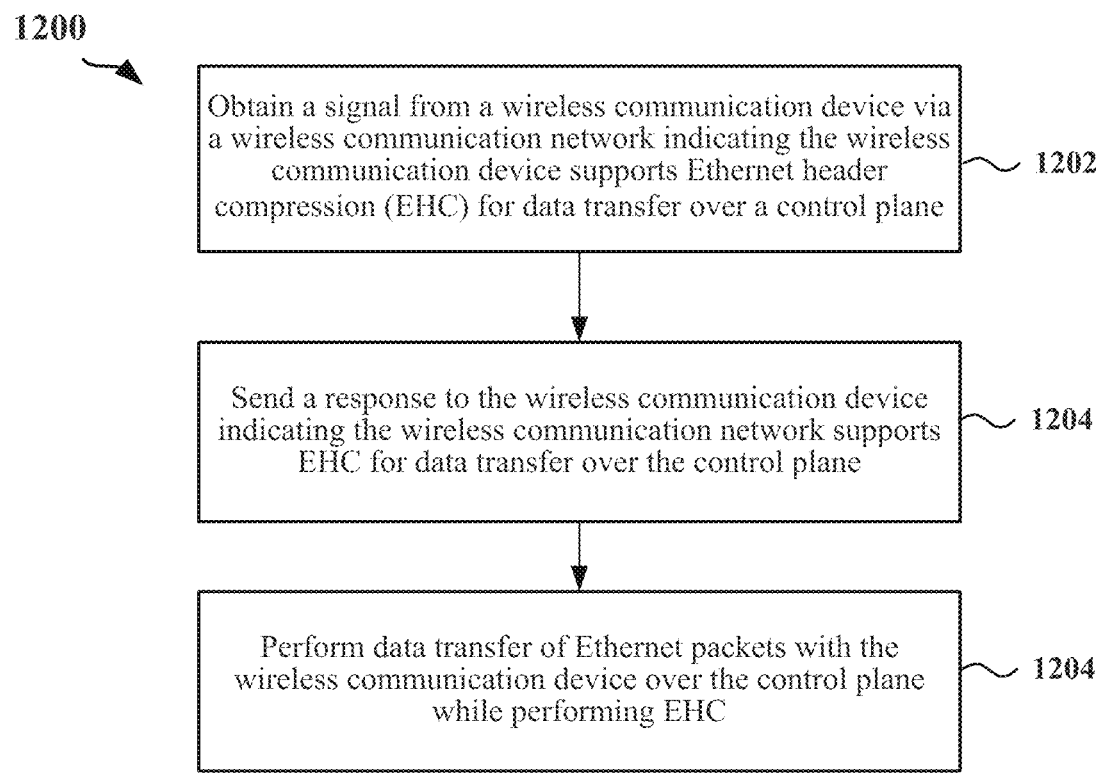
FIG. 12 is a flow chart of an exemplary method for use by a network component of a wireless communication network for use with control plane data transfer with EHC.

FIG. 12 is a flow chart 1200 of a method for use by a network component of a wireless communication network. In some examples, the method may be performed by the core network 1000 described above and illustrated in FIG. 10, by a processor or processing system, or by any suitable means for carrying out the described functions. In some examples, the network component is in communication with a UE, such as the UE 1100 of FIG. 11. In some examples, the network component includes separate individual components or nodes (such as separate AMF and SMF nodes) and at least some of the functions, procedures or operations of FIG. 12 may be performed by different components or nodes of the overall network component referred to in FIG. 12.

At block 1202, the network component obtains a signal from a wireless communication device via a wireless communication network indicating the wireless communication device supports EHC for data transfer over a control plane. (Herein, "obtain" broadly covers, e.g., generate, acquire, receive, retrieve, or perform any other suitable corresponding actions.) At block 1204, the network component sends a response to the wireless communication device indicating the wireless communication network supports EHC for data transfer over the control plane. At block 1206, the network component performs data transfer of Ethernet packets with the wireless communication device over the control plane while performing EHC.

In some aspects, the network component referred to in FIG. 12 is a mobility management component (e.g. an AMF) and the signal obtained from the wireless communication device is a mobility management registration request message from a UE that includes an indication of support by the UE for EHC for data transfer over the control plane of the wireless communication network. In some aspects, the response indicating the wireless communication network supports EHC for data transfer over the control plane is a mobility management registration acceptance message sent by an AMF to the UE. In some aspects, the network component is a session management component (e.g. an SMF) and the signal obtained from the wireless communication device is a session establishment request from a UE that includes an indication of support by the UE for EHC for data transfer over the control plane of the wireless communication network. In some aspects, the response indicating the wireless communication network supports EHC for data transfer over the control plane is a session establishment acknowledgement message sent by an SMF to the UE.

In some aspects, the SMF performs various session management operations to initiate a data transfer, such as selecting a field length for a Context ID field. The data transfer of the Ethernet packets over the control plane while performing EHC may then be performed once a data transfer session is established with the selected field length.

Figure 13:
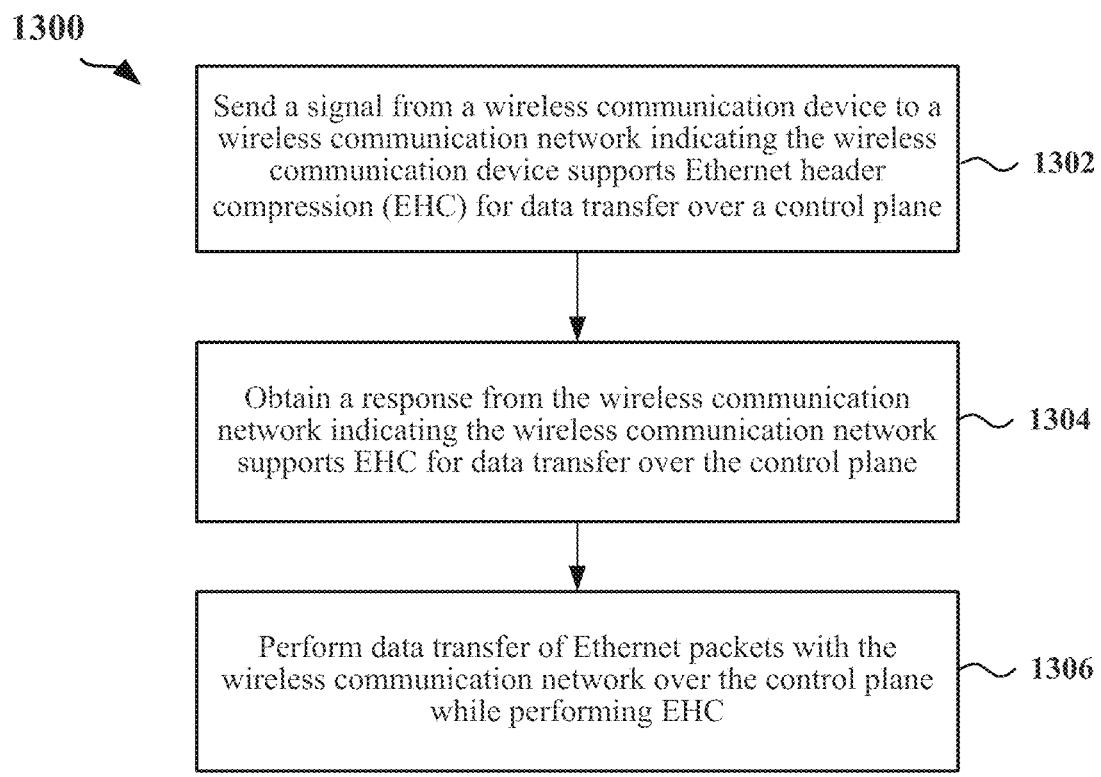
FIG. 13 is a flow chart of an exemplary method for use by a wireless communication device of a wireless communication network for use with control plane data transfer with EHC.

FIG. 13 is a flow chart 1300 of a method for use by a wireless communication device of a wireless communication network. In some examples, the method may be performed by the UE 1100 described above and illustrated in FIG. 11, by a processor or processing system, or by any suitable means for carrying out the described functions. In some examples, the wireless communication device is in communication with a wireless network component, such as the one shown in FIG. 10 that includes a core network with separate individual components or nodes (such as separate AMF and SMF nodes).

At block 1302, the wireless communication device sends a signal to a wireless communication network indicating the wireless communication device supports EHC for data transfer over a control plane. At block 1304, the wireless communication device obtains a response from the wireless communication network indicating the wireless communication network supports EHC for data transfer over the control plane. At block 1306, the wireless communication device performs data transfer of Ethernet packets with the wireless communication network over the control plane while performing EHC.

In some aspects, the wireless communication network referred to in FIG. 13 includes a mobility management component (e.g. an AMF) and the signal sent to the wireless communication network is a mobility management registration request message that includes an indication of support by a UE for EHC for data transfer over the control plane of the wireless communication network. In some aspects, the response obtained from the wireless communication network indicating the network supports EHC for data transfer over the control plane is a mobility management registration acceptance message received from the AMF by the UE. In some aspects, the wireless communication network includes a session management component (e.g. an SMF) and the signal sent to the wireless communication network is a session establishment request that includes an indication of support by the UE for EHC for data transfer over the control plane of the wireless communication network. In some aspects, the response obtained from the wireless communication network is a session establishment acknowledgement message sent by an SMF to the UE. In some aspects, the wireless communication device relies on the SMF to perform session management operations to initiate a data transfer, such as selecting a field length for a Context ID field. Data transfer of Ethernet packets over the control plane while performing EHC may be performed once a data transfer session is established with the selected field length.

Figure 14:
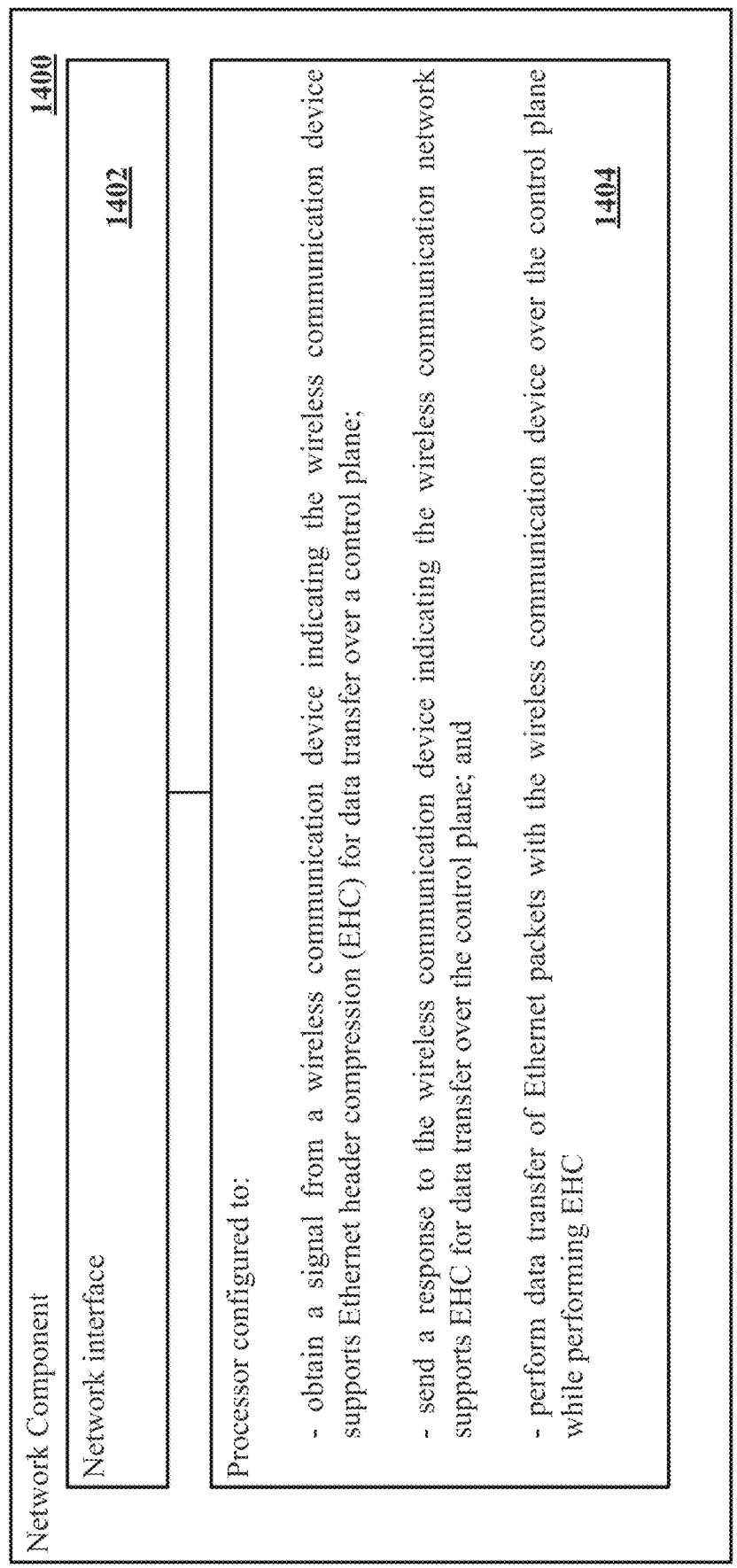
FIG. 14 is a block diagram illustrating an example of a network component of a wireless communication network having a processor configured to perform certain functions related to control plane data transfer with EHC.

FIG. 14 is a block diagram illustrating a network component 1400 of a wireless communication network. The network component 1400 includes a network interface 1402 (such as a wireless communication interface or transceiver) and a processor 1404. The processor 1404 is configured to or equipped to: obtain a signal from a wireless communication device (such as a UE) indicating the wireless communication device supports EHC for data transfer over a control plane; send a response to the wireless communication device indicating the wireless communication network supports EHC for data transfer over the control plane; and perform data transfer of Ethernet packets with the wireless communication device over the control plane while performing EHC.

Figure 15:
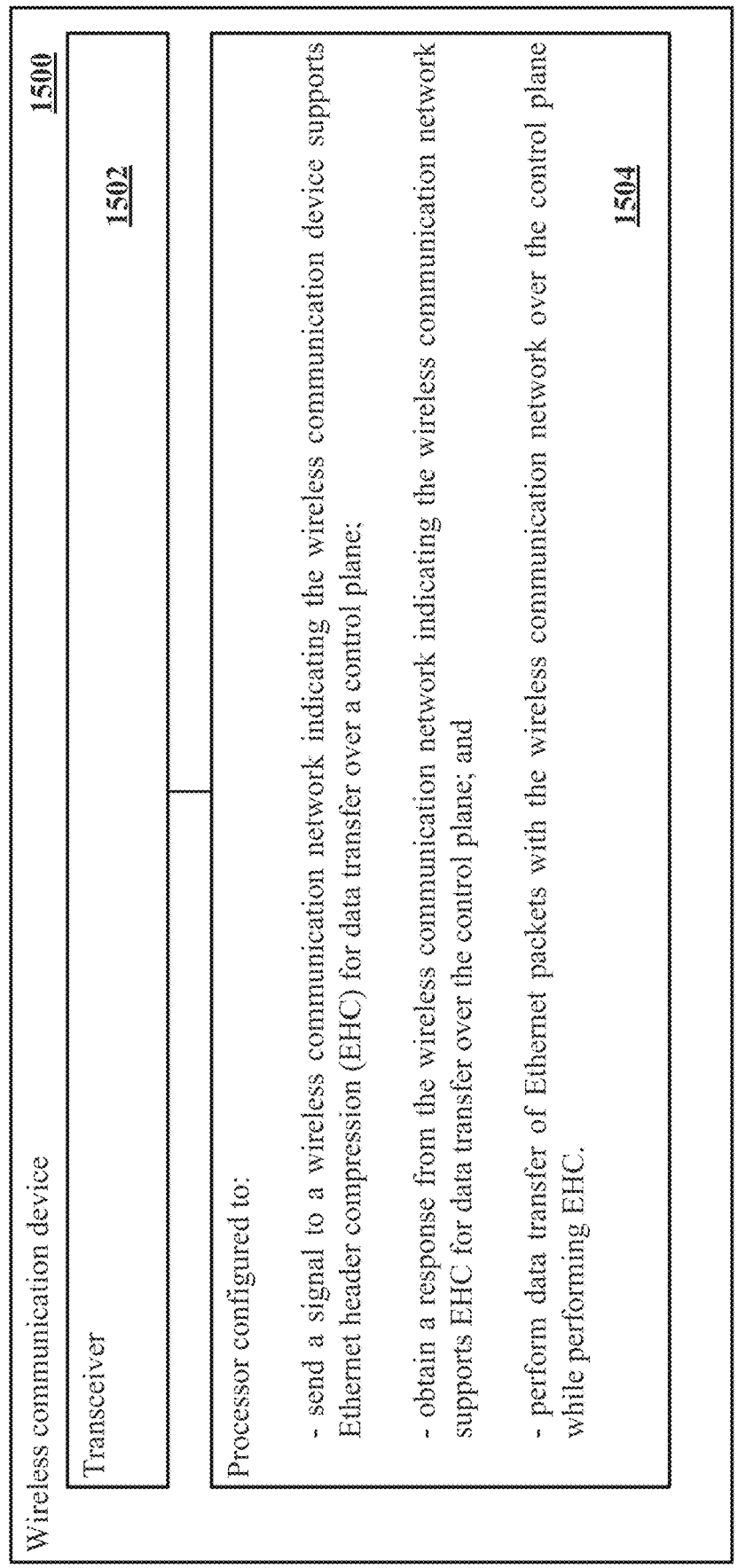
FIG. 15 is a block diagram illustrating an example of a wireless communication device of a wireless communication network having a processor configured to perform certain functions related to control plane data transfer with EHC.

FIG. 15 is a block diagram illustrating a wireless communication device 1500 for use in a wireless communication network. The wireless communication device 1500 includes a transceiver 1502 and a processor 1504. The processor 1504 is configured to or equipped to: send a signal to a wireless communication network indicating the wireless communication device supports Ethernet header compression (EHC) for data transfer over a control plane; obtain a response from the wireless communication network indicating the wireless communication network supports EHC for data transfer over the control plane; and perform data transfer of Ethernet packets with the wireless communication network over the control plane while performing EHC.

FIG. 16 is a block diagram illustrating components of a core network 1600 of a wireless communication network. The core network 1600 includes a network interface 1602 (e.g. a wireless transceiver) and various processing components or controllers connected or coupled to the network interface 1602 and/or to one another. A receive component or controller 1604 is configured to receive and decode a signal from a wireless communication device (such as a UE) that includes an indicator to indicate the wireless communication device supports EHC for data transfer over a control plane of the wireless communication network. A response component or controller 1606 is configured to generate and send a response to the wireless communication device indicating the wireless communication network supports EHC for data transfer over the control plane of the wireless communication network (assuming the wireless communication network indeed supports EHC for control plane data transfer). A data transfer component or controller 1608 is configured to perform or control data transfer of Ethernet packets with the wireless communication device over the control plane of the wireless communication network while performing EHC.

FIG. 17 is a block diagram illustrating components of a wireless communication device 1700 such as a UE. The wireless communication device 1700 includes a wireless transceiver 1702 and various processing components or controllers connected or coupled to the wireless transceiver 1702 and/or to one another. A capability announcement component or controller 1704 is configured to generate and send a signal to a wireless communication network indicating the wireless communication device supports EHC for data transfer over a control plane of the wireless communication network. A receive component or controller 1706 is configured to receive and decode a response from the wireless communication network indicating the wireless communication network supports EHC for data transfer over the control plane. A data transfer component or controller 1708 is configured to perform or control data transfer of Ethernet packets with the wireless communication network over the control plane of the wireless communication network while performing EHC.

In some aspects, means are provided for performing the various functions described herein. By way of example, an apparatus may be provided that includes: means (such as receive component 1602) for obtaining a signal from a wireless communication device via a wireless communication network indicating the wireless communication device supports EHC for data transfer over a control plane; means (such as AMF 310, mobility management circuitry 1042, or response component 1606) for sending a response to the wireless communication device indicating the wireless communication network supports EHC for data transfer over the control plane; and means (such as control plane Ethernet header compression/decompression circuitry 1046 or data transfer component 1608) for performing data transfer of Ethernet packets with the wireless communication device over the control plane while performing EHC.

As another example, an apparatus may be provided that includes: means (such as capability announcement component 1704) for sending a signal to a wireless communication network indicating the wireless communication device supports EHC for data transfer over a control plane; means (such as mobility management circuitry 1142 or receive component 1706) for obtaining a response from the wireless communication network indicating the wireless communication network supports EHC for data transfer over the control plane; and means (such as control plane Ethernet header compression/decompression circuitry 1146 or data transfer component 1708) for performing data transfer of Ethernet packets with the wireless communication network over the control plane while performing EHC.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Figure 18:
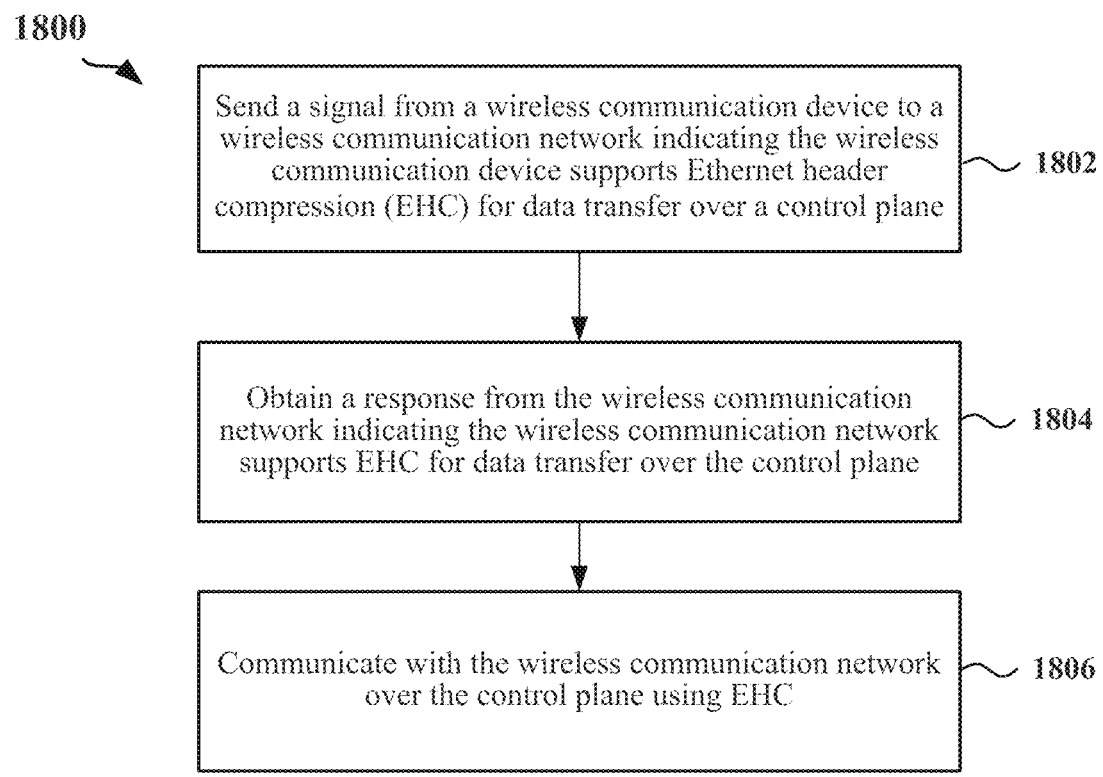
FIG. 18 a flow chart of an exemplary method for use by a wireless communication device of a wireless communication network.

FIG. 18 is a flow chart 1800 of a method for use by a wireless communication device of a wireless communication network. In some examples, the method may be performed by the UE 1100 described above and illustrated in FIG. 11, by the wireless communication device 2300 described below and illustrated in FIG. 23, by a processor or processing system, or by any suitable means for carrying out the described functions. In some examples, the wireless communication device is in communication with a wireless network component, such as the one shown in FIG. 11 or the one shown in FIG. 22, discussed below.

At block 1802, the wireless communication device sends a signal to a wireless communication network indicating the wireless communication device supports EHC for data transfer over a control plane. In some aspects, this is achieved by sending a mobility management registration request message that includes an indication of support for EHC for data transfer over the control plane. At block 1804, the wireless communication device obtains a response from the wireless communication network indicating the wireless communication network supports EHC for data transfer over the control plane. In some aspects, this is achieved by receiving an indication of support for EHC within a mobility management registration acceptance message. At block 1806, the wireless communication device communicates with the wireless communication network over the control plane using EHC. In some aspects, the wireless communication device communicates with the wireless communication network over the control plane using EHC by sending at least one Ethernet packet compressed using EHC to the wireless communication network over the control plane. In some aspects, the wireless communication device communicates with the wireless communication network over the control plane using EHC by receiving at least one Ethernet packet compressed using EHC to the wireless communication network over the control plane. As explained above, and as summarized in FIG. 19, discussed below, before the wireless communication device communicates with the wireless communication network over the control plane using EHC, the wireless communication device, in some aspects, requests to use EHC for data transfer over the control plane.

Figure 19:
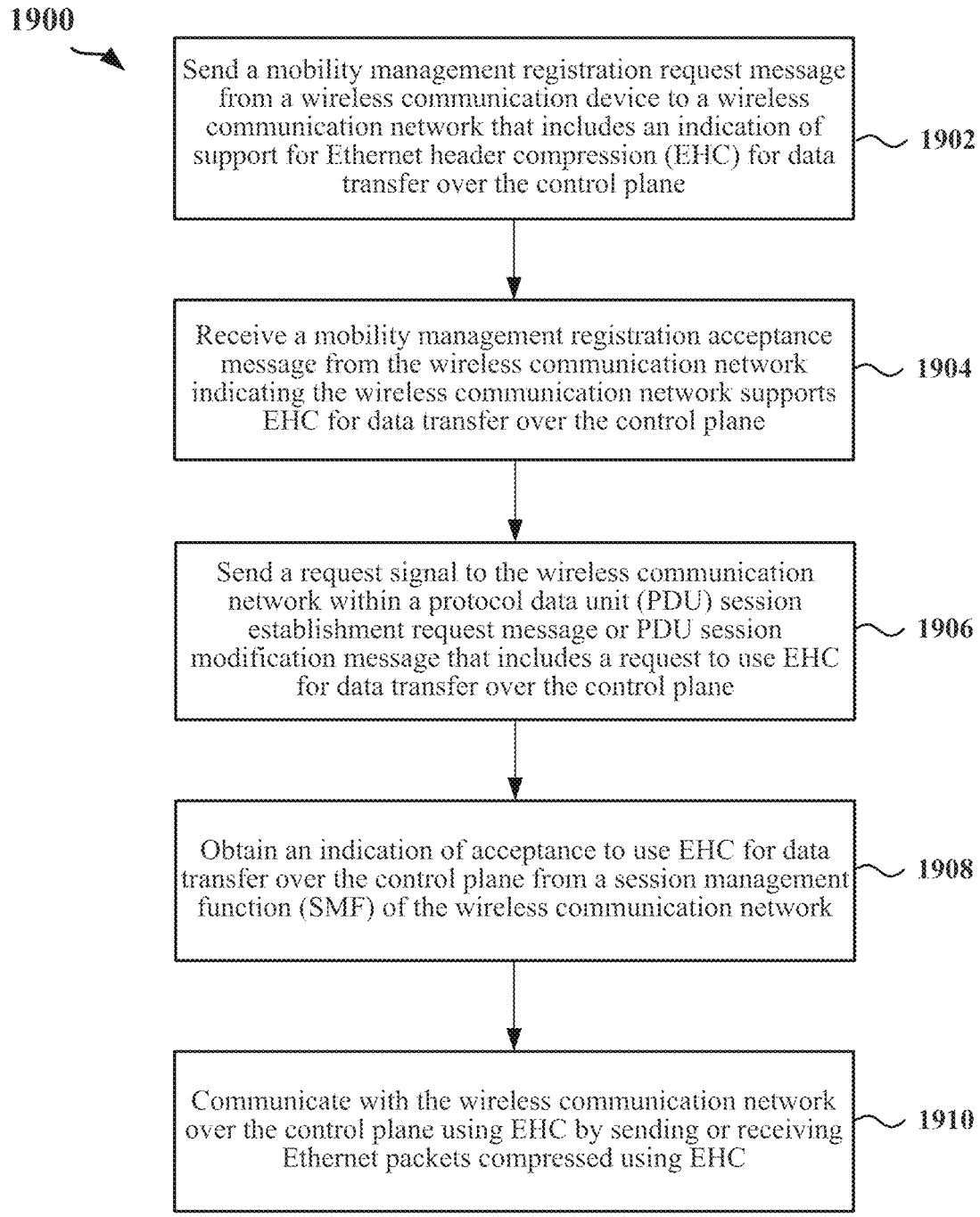
FIG. 19 a flow chart of another exemplary method for use by a wireless communication device of a wireless communication network.

FIG. 19 is a flow chart 1900 of a method for use by a wireless communication device of a wireless communication network. In some examples, the method may be performed by the UE 1100 described above and illustrated in FIG. 11, by the wireless communication device 2300 described below and illustrated in FIG. 23, by a processor or processing system, or by any suitable means for carrying out the described functions. In some examples, the wireless communication device is in communication with a wireless network component, such as the one shown in FIG. 10 or the one shown in FIG. 22, discussed below.

At block 1902, the wireless communication device sends a mobility management registration request message to a wireless communication network that includes an indication of support for EHC for data transfer over the control plane. At block 1904, the wireless communication device receives a mobility management registration acceptance message from the wireless communication network indicating the wireless communication network supports EHC for data transfer over the control plane. At block 1906, the wireless communication device sends a request signal to the wireless communication network within a PDU session establishment request message or PDU session modification message that includes a request to use EHC for data transfer over the control plane. At block 1908, the wireless communication device obtains an indication of acceptance to use EHC for data transfer over the control plane from an SMF of the wireless communication network. At block 1910, the wireless communication device communicates with the wireless communication network over the control plane using EHC by sending or receiving Ethernet packets compressed using EHC.

Figure 20:
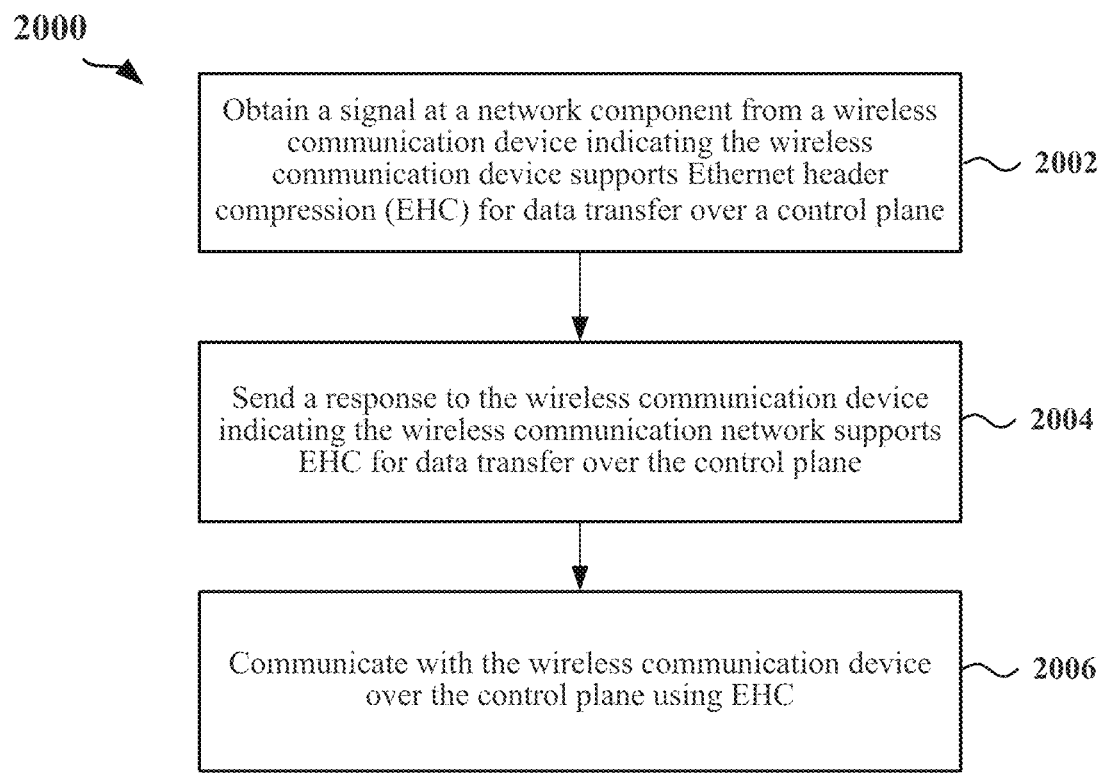
FIG. 20 a flow chart of an exemplary method for use by a network component of a wireless communication network.

FIG. 20 is a flow chart 2000 of a method for use by a network component of a wireless communication network. In some examples, the method may be performed by the core network 1000 described above and illustrated in FIG. 10, by the network component 2200 described below and illustrated in FIG. 22, by a processor or processing system, or by any suitable means for carrying out the described functions.

In some examples, the network component is in communication with a UE or other wireless communication device, such as the UE 1100 of FIG. 11 or the wireless communication device 2300 of FIG. 23, discussed below.

At block 2002, the network component obtains a signal from a wireless communication device indicating the wireless communication device supports EHC for data transfer over a control plane. In some aspects, the signal is a mobility management registration request message that includes an indication of support for EHC for data transfer over the control plane. At block 2004, the network component sends a response to the wireless communication device indicating the wireless communication network supports EHC for data transfer over the control plane. In some aspects, the response is sent within a mobility management registration acceptance message. At block 2006, the network component communicates with the wireless communication device over the control plane using EHC. In some aspects, the network component communicates with the wireless communication device over the control plane using EHC by sending at least one Ethernet packet compressed using EHC to the wireless communication device over the control plane. In some aspects, the network component communicates with the wireless communication device over the control plane using EHC by receiving at least one Ethernet packet compressed using EHC to the wireless communication device over the control plane. As explained above, and as summarized in FIG. 21, discussed below, before the network component communicates with the wireless communication network over the control plane using EHC, the wireless communication device, in some aspects, requests to use EHC for data transfer over the control plane.

Figure 21:
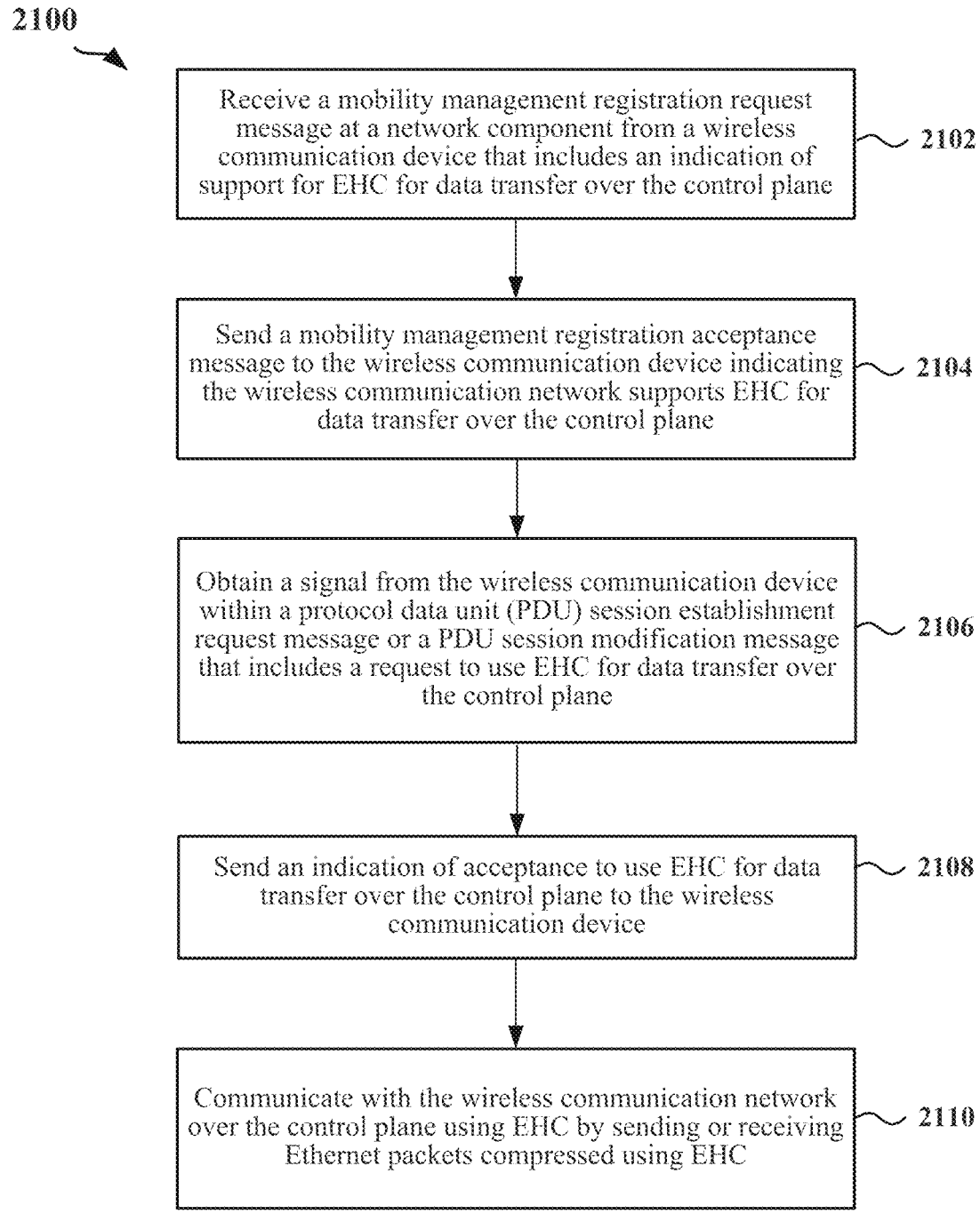
FIG. 21 a flow chart of another exemplary method for use by a network component of a wireless communication network.

FIG. 21 is a flow chart 2100 of a method for use by a network component of a wireless communication network. In some examples, the method may be performed by the core network 1000 described above and illustrated in FIG. 10, by the network component 2200 described below and illustrated in FIG. 22, by a processor or processing system, or by any suitable means for carrying out the described functions. In some examples, the network component is in communication with a UE or other wireless communication device, such as the UE 1100 of FIG. 11 or the wireless communication device 2300 of FIG. 23, discussed below.

At block 2102, the network component receives a mobility management registration request message from a wireless communication device that includes an indication of support for EHC for data transfer over the control plane. At block 2104, the network component sends a mobility management registration acceptance message to the wireless communication device indicating the wireless communication network supports EHC for data transfer over the control plane. At block 2106, the network component obtains a signal from the wireless communication device within a PDU session establishment request message or a PDU session modification message that includes a request to use EHC for data transfer over the control plane. At 2108, the network component sends an indication of acceptance to use EHC for data transfer over the control plane to the wireless communication device, which may be generated by an SMF of the wireless communication network. At block 2110, the network component communicates with the wireless communication device over the control plane using EHC by sending or receiving Ethernet packets compressed using EHC.

Figure 22:
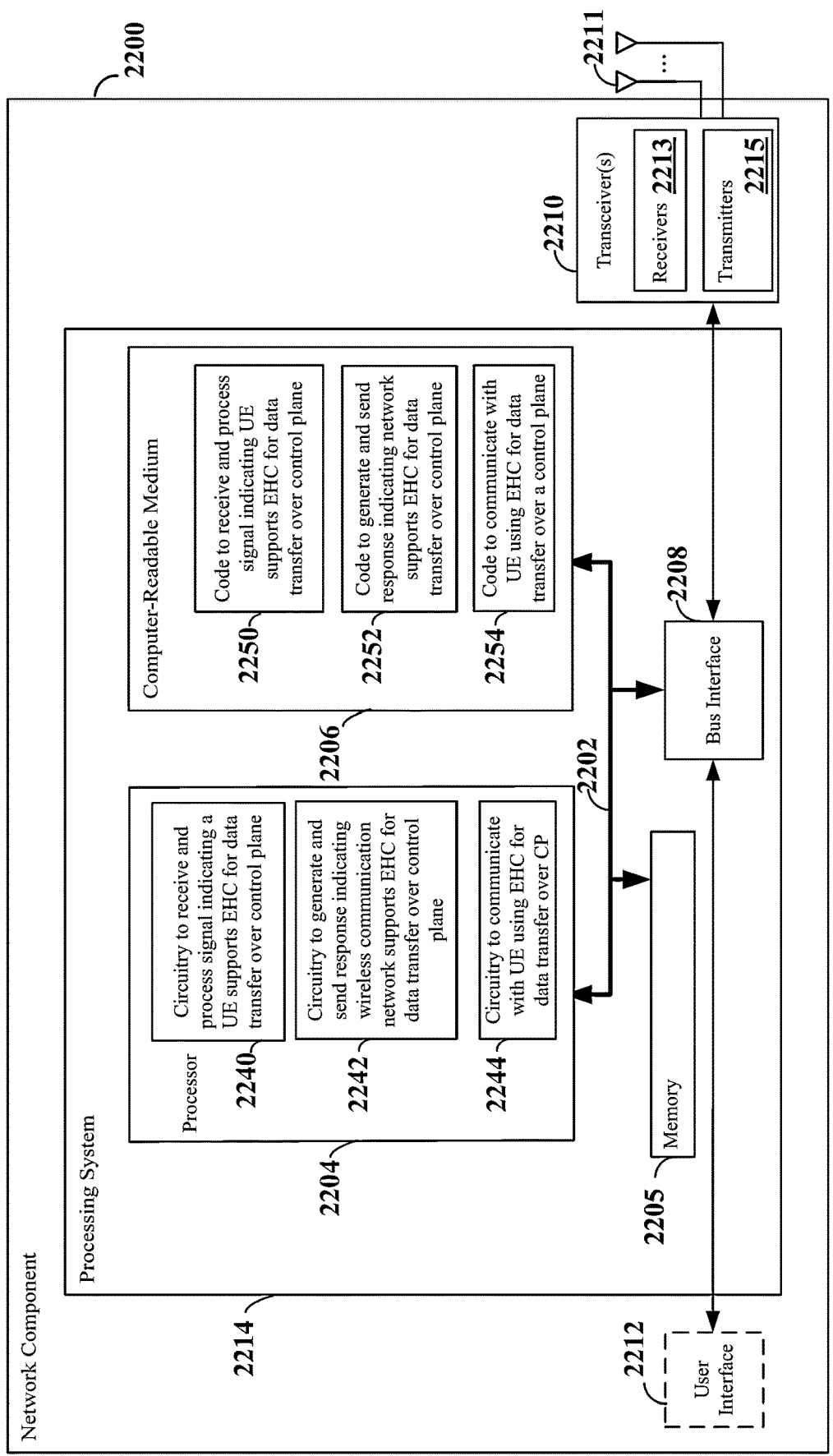
FIG. 22 is a block diagram illustrating an example of a hardware implementation of a network component of a wireless communication network.

FIG. 22 is a block diagram illustrating an example of a hardware implementation for a network component 2200 employing a processing system 2214. For example, the network component may correspond to a component of a network that includes the AMF and SMF components shown and described above in reference to FIGS. 3, 4, and/or 7.

The network component 2200 may be implemented with a processing system 2214 that includes one or more processors 2204. Examples of processors 2204 include microprocessors, microcontrollers, DSPs, FPGAs, PLDs, state machines, gated logic, discrete hardware circuits, and other suitable hardware configured to perform the various functionality described throughout this disclosure. In various examples, the network component 2200 may be configured to perform any one or more of the network component functions described herein. That is, the processor 2204, as utilized in the network component 2200, may be used to implement any one or more of the processes and procedures described herein that pertain to the operation of a network component.

The overall architecture of the processing system 2214 may be similar to the processing system 1014 illustrated in FIG. 10, including a bus interface 2208, a bus 2202, memory 2205, a processor 2204, and a computer-readable medium 2206. Furthermore, the network component 2200 may include a user interface 2212 and a transceiver 2210 for communicating with various other apparatus (e.g., a UE) over a transmission medium. In FIG. 22, the transceiver 2210 is shown to include one or more receivers 2213 and one or more transmitters, which are connected to one or more antennas 2211.

The processor 2204 is responsible for managing the bus 2202 and general processing, including the execution of software stored on the computer-readable medium 2206. The software, when executed by the processor 2204, causes the processing system 2214 to perform the various functions described below for any particular apparatus. The computer-readable medium 2206 and the memory 2205 may also be used for storing data that is manipulated by the processor 2204 when executing software.

The computer-readable medium 2206 may be a non-transitory computer-readable medium. The computer-readable medium 2206 may reside in the processing system 2214, external to the processing system 2214, or distributed across multiple entities including the processing system 2214. The computer-readable medium 2206 may be embodied in a computer program product. By way of example, a computer program product may include a computer-readable medium in packaging materials. In some examples, the computer-readable medium 2206 may be part of the memory 2205.

In some aspects of the disclosure, the processor 2204 may include circuitry configured for various functions. In some network components, different functions may be performed by different components or nodes within the network, and so separate processors may be provided within the different nodes for performing different functions. For convenience and generality, the processor 2204 of FIG. 22 is shown as having a set of processing components, controllers, or circuits.

In the example of FIG. 22, the processor 2204 may include circuitry 2240 configured to receive and process a signal indicating a wireless communication device, such as a UE, supports EHC for data transfer over control plane. The processor 2204 may also include circuitry 2242 configured to generate and send a response indicating the wireless communication network (of which the network component 2220 is a component) supports EHC for data transfer over control plane. The processor 2204 may further include circuitry 2244 configured to communicate with the wireless communication device using EHC for data transfer over the control plane (CP) by, for example, sending and receiving wireless signals using transceiver 2210. As already explained, the communication may include receiving Ethernet packets compressed using EHC from a UE and sending Ethernet packets compressed using EHC to the UE.

In some aspects, the circuitry 2240 is a means for obtaining a signal indicating from a wireless communication device indicating the wireless communication device supports EHC for data transfer over a control plane, the circuitry 2242 is a means for sending a response to the wireless communication device indicating the wireless communication network supports EHC for data transfer over the control plane, and the circuitry 2244 is a means for communicating with the wireless communication device over the control plane using EHC.

In the example of FIG. 22, the computer-readable medium 2206 may include code 2250 for receiving and processing a signal indicating a wireless communication device supports EHC for data transfer over control plane. The computer-readable medium 2206 may also include code 2252 for generating and sending a response indicating the wireless communication network (of which the network component 2220 is a component) supports EHC for data transfer over the control plane. The computer-readable medium 2206 may further include code 2254 for communicating with the wireless communication device using EHC for data transfer over the control plane.

Figure 23:
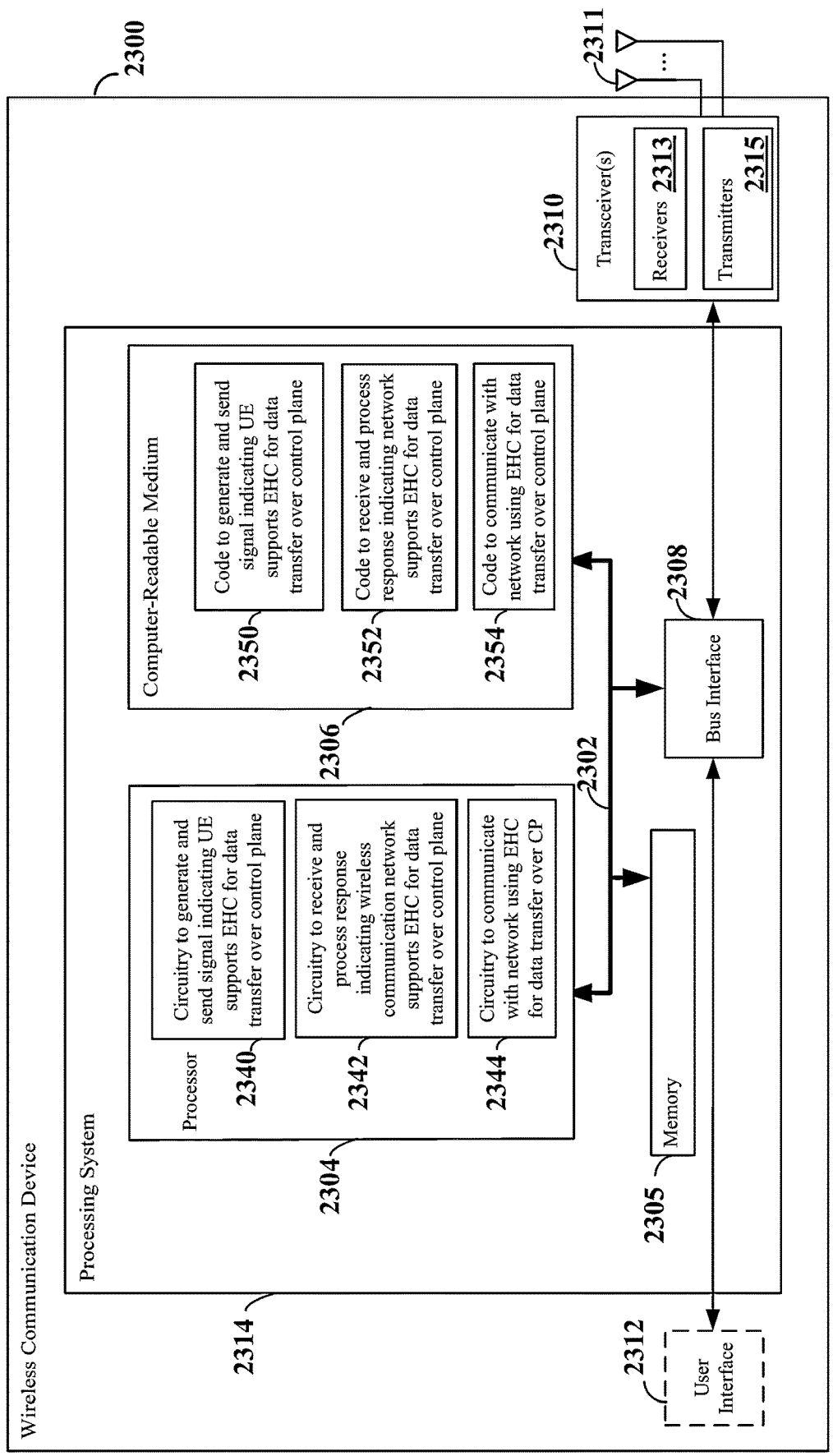
FIG. 23 is a block diagram illustrating an example of a hardware implementation for a wireless communication device.

FIG. 23 is a diagram illustrating an example of a hardware implementation for an exemplary wireless communication device 2300 employing a processing system 2314 that includes one or more processors 2304. For example, the wireless communication device may correspond to any of the UEs illustrated in FIGS. 1, 3, 4, and/or 7.

The overall architecture of the processing system 2314 may be similar to the processing system 2214 illustrated in FIG. 22, including a bus interface 2308, a bus 2302, memory 2305, a processor 2304, and a computer-readable medium 2306. Furthermore, the wireless communication device 2300 may include a user interface 2312 and a transceiver 2310 for communicating with various other apparatus over a transmission medium (e.g., an air interface for communicating with a network component). The processor 2304, as utilized in a wireless communication device 2300, may be used to implement any one or more of the processes described herein that pertain to the operation of a wireless communication device.

In some aspects of the disclosure, the processor 2304 may include circuitry configured for various functions. For example, the processor 2304 may include circuitry 2342 configured to send a signal to a wireless communication network, such as to the network component 2200 of FIG. 22, indicating the wireless communication device supports EHC for data transfer over a control plane. The circuitry 2342 may be configured to obtain a response from the wireless communication network indicating the wireless communication network supports EHC for data transfer over the control plane. The circuitry 2344 may be configured to communicate with the wireless communication network over the control plane using EHC by, for example, sending and receiving wireless signals using transceiver 2310. As already explained, the communication may include sending Ethernet packets compressed using EHC to a network component and receiving Ethernet packets compressed using EHC from the network component.

In some aspects, the circuitry 2340 is a means for sending a signal to a wireless communication network indicating the wireless communication device supports EHC for data transfer over a control plane, the circuitry 2342 is a means for obtaining a response from the wireless communication network indicating the wireless communication network supports EHC for data transfer over the control plane, and the circuitry 2344 is a means for communicating with the wireless communication network over the control plane using EHC.

In the example of FIG. 23, the computer-readable medium 2306 may include code 2350 for ending a signal to a wireless communication network indicating the wireless communication device supports EHC for data transfer over a control plane. The computer-readable medium 2306 may also include code 2352 for obtaining a response from the wireless communication network indicating the wireless communication network supports EHC for data transfer over the control plane. The computer-readable medium 2306 may further include code 2354 for communicating with the wireless communication network using EHC for data transfer over the control plane.

The following provides an overview of examples of the present disclosure.

Example 1: a wireless communication device comprises: a transceiver; and a processor coupled to the transceiver, wherein the processor is configured to: send a signal to a wireless communication network indicating the wireless communication device supports EHC for data transfer over a control plane; obtain a response from the wireless communication network indicating the wireless communication network supports EHC for data transfer over the control plane; and communicate with the wireless communication network over the control plane using EHC.

Example 2: the wireless communication device of example 1, wherein the processor is further configured to send the signal as a mobility management registration request message that includes an indication of support for EHC for data transfer over the control plane.

Example 3: the wireless communication device of examples 1 or 2, wherein the processor is further configured to obtain the response from the wireless communication network within a mobility management registration acceptance message.

Example 4: the wireless communication device of examples 1, 2, or 3, wherein the processor is further configured to send a request signal to the wireless communication network that includes a request to use EHC for data transfer over the control plane.

Example 5: the wireless communication device of examples 1, 2, 3, or 4, wherein the processor is further configured to send the request signal within a PDU session establishment request message.

Example 6: the wireless communication device of examples 1, 2, 3, or 4, wherein the processor is further configured to send the request signal within a PDU session modification message.

Example 7: the wireless communication device of examples 1, 2, 3, 4, 5, or 6, wherein the processor is further configured to send an Ethernet packet compressed using EHC over the control plane to communicate with the wireless communication network.

Example 8: the wireless communication device of examples 1, 2, 3, 4, 5, 6, or 7, wherein the processor is further configured to receive an Ethernet packet compressed using EHC over the control plane to communicate with the wireless communication network.

Example 9: a method of wireless communication for use by a wireless communication device, the method comprising: sending a signal to a wireless communication network indicating the wireless communication device supports EHC for data transfer over a control plane; obtaining a response from the wireless communication network indicating the wireless communication network supports EHC for data transfer over the control plane; and communicating with the wireless communication network over the control plane using EHC.

Example 10: the method of example 9, wherein sending the signal comprises sending a mobility management registration request message that includes an indication of support for EHC for data transfer over the control plane.

Example 11: the method of examples 9 or 10, wherein obtaining the response from the wireless communication network comprises receiving an indication of support for EHC within a mobility management registration acceptance message.

Example 12: the method of examples 9, 10, or 11, further comprising sending a request signal to the wireless communication network that includes a request to use EHC for data transfer over the control plane.

Example 13: the method of examples 9, 10, 11, or 12, wherein the request signal comprises a PDU session establishment request message.

Example 14: the method of examples 9, 10, 11, or 12, wherein the request signal comprises a protocol data unit (PDU) session modification message.

Example 15: the method of examples 9, 10, 11, 12, or 13, wherein communicating with the wireless communication network comprises sending an Ethernet packet compressed using EHC to the wireless communication network over the control plane.

Example 16: the method of examples 9, 10, 11, 12, 13, 14, or 15, wherein communicating with the wireless communication network comprises receiving an Ethernet packet compressed using EHC from the wireless communication network over the control plane.

Example 17: a network component of a wireless communication network, the network component comprising: a network interface; and a processor coupled to the network interface, wherein the processor is configured to obtain a signal from a wireless communication device indicating the wireless communication device supports Ethernet header compression (EHC) for data transfer over a control plane; send a response to the wireless communication device indicating the wireless communication network supports EHC for data transfer over the control plane; and communicate with the wireless communication device over the control plane using EHC.

Example 18: the network component of example 17, wherein the processor is further configured to obtain the signal as a mobility management registration request message that includes an indication of support for EHC for data transfer over the control plane.

Example 19: the network component of examples 17 or 18, wherein the processor is further configured to send the response to the wireless communication device within a mobility management registration acceptance message.

Example 20: the network component of examples 17, 18, or 19, wherein the processor is further configured to obtain a request signal from the wireless communication device that includes a request to use EHC for data transfer over the control plane.

Example 21: the network component of examples 17, 18, 19, or 20, wherein the processor is further configured to obtain the request signal within a protocol data unit (PDU) session establishment request message.

Example 22: the network component of examples 17, 18, 19, or 20, wherein the processor is further configured to obtain the signal including the request to use EHC for data transfer within a protocol data unit (PDU) session modification message.

Example 23: the network component of examples 17, 18, 19, 20, 21, or 22, wherein the processor is further configured to send an Ethernet packet compressed using EHC over the control plane to communicate with the wireless communication device.

Example 24: the network component of examples 17, 18, 19, 20, 21, 22, or 23, wherein the processor is further configured to receive an Ethernet packet compressed using EHC over the control plane to communicate with the wireless communication device.

Example 25: a method of wireless communication for use by a network component of a wireless communication network, the method comprising: obtaining a signal from a wireless communication device indicating the wireless communication device supports EHC for data transfer over a control plane; sending a response to the wireless communication device indicating the wireless communication network supports EHC for data transfer over the control plane; and communicating with the wireless communication device over the control plane using EHC.

Example 26: the method of example 25, wherein obtaining the signal comprises receiving a mobility management registration request message that includes an indication of support for EHC for data transfer over the control plane.

Example 27: the method of examples 25 or 26, further comprising obtaining a request signal from the wireless communication device that includes a request to use EHC for data transfer over the control plane.

Example 28: the method of examples 25, 26, or 27, further comprising sending an indication of acceptance to use EHC to the wireless communication device.

Example 29: the method of examples 25, 26, 27, or 28, wherein communicating with the wireless communication device over the control plane using EHC comprises sending an Ethernet packet compressed using EHC over the control plane.

Example 30: the method of examples 25, 26, 27, 28, or 29, wherein communicating with the wireless communication device over the control plane using EHC comprises receiving an Ethernet packet compressed using EHC over the control plane.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 4, 7, 10, 11, 14, 15, 16, 17, 22, and 23 may be configured to perform one or more of the methods, features, or steps described herein. The algorithms described herein may also be implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A wireless communication device, comprising:
   a transceiver; and
   a processor coupled to the transceiver, wherein the processor is configured to:
      send a mobility management registration request signal to a wireless communication network indicating the wireless communication device supports Ethernet header compression (EHC) for data transfer over a control plane;
      obtain a mobility management registration response from the wireless communication network indicating the wireless communication network supports EHC for data transfer over the control plane;
      send a session establishment request signal to the wireless communication network comprising a request to establish a session, the session establishment request signal further comprising a request to use EHC during the session and a request for a field length for an EHC Context identification (ID);
obtain a session establishment acknowledgement from the wireless communication network in response to the request to establish a session that uses EHC and that comprises an indicator that provides the field length for the EHC Context ID; and
send data compressed using EHC to the wireless communication network over the control plane, the data comprising the EHC Context ID configured in accordance with the field length, wherein a first uncompressed data packet and one or more subsequent compressed data packets each include the EHC Context ID.

2. The wireless communication device of claim 1, wherein the processor is further configured to send the session establishment request signal within a protocol data unit (PDU) session establishment request message.

3. The wireless communication device of claim 1, wherein the processor is further configured to send the session establishment request signal within a protocol data unit (PDU) session modification message.

4. The wireless communication device of claim 1, wherein the field length is either 7 or 15 bits.

5. The wireless communication device of claim 1, wherein the processor is further configured to send the data compressed using EHC to a user plane component of the wireless communication network via a session management component of the wireless communication network.

6. The wireless communication device of claim 1, wherein the request to use EHC during the session and the request for a field length for the EHC Context ID together consist of an indicator having two or fewer bits.

7. The wireless communication device of claim 1, wherein the processor is further configured to obtain the mobility management registration response indicating the wireless communication network supports EHC for data transfer over the control plane from an access and mobility management function (AMF) of a core network of the wireless communication network.

8. The wireless communication device of claim 1, wherein the processor is further configured to send the data compressed using EHC to an external data network of the wireless communication network via an access and mobility management function (AMF), a session management function (SMF), and then a User Plane Function (UPF).

9. The wireless communication device of claim 1, wherein the processor is further configured to:
send a first portion of data compressed using EHC to a first external data network of the wireless communication network via an access and mobility management function (AMF), a session management function (SMF), and then a first User Plane Function (UPF); and
send a second portion of data compressed using EHC to a second external data network of the wireless communication network via the AMF, the SMF, and then a second User Plane Function (UPF), the second portion of data sent using a different Context ID.

10. A method of wireless communication for use by a wireless communication device, the method comprising:
sending a mobility management registration request signal to a wireless communication network indicating the wireless communication device supports Ethernet header compression (EHC) for data transfer over a control plane;
obtaining a mobility management registration response from the wireless communication network indicating the wireless communication network supports EHC for data transfer over the control plane;
sending a session establishment request signal to the wireless communication network comprising a request to establish a session, the session establishment request signal further comprising a request to use EHC during the session and a request for a field length for an EHC Context identification (ID);
obtaining a session establishment acknowledgement from the wireless communication network in response to the request to establish a session that uses EHC and that comprises an indicator that provides the field length for the EHC Context ID; and
sending data compressed using EHC to the wireless communication network over the control plane, the data comprising the EHC Context ID configured in accordance with the field length, wherein a first uncompressed data packet and one or more subsequent compressed data packets each include the EHC Context ID.

11. The method of claim 10, wherein the session establishment request signal comprises a protocol data unit (PDU) session establishment request message.

12. The method of claim 10, wherein the session establishment request signal comprises a protocol data unit (PDU) session modification message.

13. The method of claim 10, wherein the field length is either 7 or 15 bits.

14. The method of claim 10, further comprising sending the data compressed using EHC to a user plane component of the wireless communication network via a session management component of the wireless communication network.

15. The method of claim 10, wherein the request to use EHC during the session and the request for a field length for the EHC Context ID together consist of an indicator having two or fewer bits.

16. The method of claim 10, wherein the mobility management registration response indicating the wireless communication network supports EHC for data transfer over the control plane is obtained from an access and mobility management function (AMF) of a core network of the wireless communication network.

17. The method of claim 10, wherein sending the data compressed using EHC comprises sending the data to an external data network of the wireless communication network via an access and mobility management function (AMF), a session management function (SMF), and then a User Plane Function (UPF).

18. The method of claim 10, wherein sending the data compressed using EHC comprises:
sending a first portion of the data to a first external data network of the wireless communication network via an access and mobility management function (AMF), a session management function (SMF), and then a first User Plane Function (UPF); and
sending a second portion of the data to a second external data network of the wireless communication network via the AMF, the SMF, and then a second User Plane Function (UPF), the second portion of data sent using a different Context ID.

19. A network component of a wireless communication network, the network component comprising:
a network interface; and
a processor coupled to the network interface, wherein the processor is configured to obtain a mobility management registration request signal from a wireless communication device indicating the wireless communication device supports Ethernet header compression (EHC) for data transfer over a control plane;

send a mobility management registration response to the wireless communication device indicating the wireless communication network supports EHC for data transfer over the control plane;

obtain a session establishment request signal from the wireless communication device comprising a request to establish a session, the session establishment request signal further comprising a request to use EHC during the session and a request for a field length for an EHC Context identification (ID);

send a session establishment acknowledgement to the wireless communication device in response to the request to establish a session that uses EHC and that comprises an indicator that provides a selected field length for the EHC Context ID; and obtain data compressed using EHC from the wireless communication device over the control plane, the data comprising the EHC Context ID configured in accordance with the selected field length, wherein a first uncompressed data packet and one or more subsequent compressed data packets each include the EHC Context ID.

20. The network component of claim 19, wherein the processor is further configured to obtain the session establishment request signal within a protocol data unit (PDU) session establishment request message.

21. The network component of claim 19, wherein the processor is further configured to obtain the session establishment request signal within a protocol data unit (PDU) session modification message.

22. The network component of claim 19, wherein the selected field length is either 7 or 15 bits.

23. The network component of claim 19, wherein the request to use EHC during the session and the request for a field length for the EHC Context ID together consist of an indicator having two or fewer bits.

24. The network component of claim 19, wherein the processor is further configured to obtain the data compressed using EHC from the wireless communication device via an access and mobility management function (AMF).

25. The network component of claim 24, wherein the processor is further configured to obtain the data within at least two Ethernet flows having different Context IDs.

26. A method of wireless communication for use by a network component of a wireless communication network, the method comprising:

obtaining a mobility management registration request signal from a wireless communication device indicating the wireless communication device supports Ethernet header compression (EHC) for data transfer over a control plane;

sending a mobility management registration response to the wireless communication device indicating the wireless communication network supports EHC for data transfer over the control plane;

obtaining a session establishment request signal from the wireless communication device comprising a request to establish a session, the session establishment request signal further comprising a request to use EHC during the session and a request for a field length for an EHC Context identification (ID);

sending a session establishment acknowledgement to the wireless communication device in response to the request to establish a session that uses EHC and further comprises a selected field length for the EHC Context ID; and obtaining data compressed using EHC from the wireless communication device over the control plane, the data comprising the EHC Context ID configured in accordance with the selected field length, wherein a first uncompressed data packet and one or more subsequent compressed data packets each include the EHC Context ID.

27. The method of claim 26, wherein the selected field length is either 7 or 15 bits.

28. The method of claim 26, wherein the request to use EHC during the session and the request for a field length for the EHC Context ID together consist of an indicator having two or fewer bits.

29. The method of claim 26, wherein obtaining the data compressed using EHC comprises obtaining the data from the wireless communication device via an access and mobility management function (AMF).

30. The method of claim 29, wherein the data is obtained within at least two Ethernet flows having different Context IDs.

* * * * *